(12) United States Patent
David

(10) Patent No.: US 6,577,411 B1
(45) Date of Patent: Jun. 10, 2003

(54) OPTICAL SYSTEM FOR ALTERNATIVE OR SIMULTANEOUS DIRECTION OF LIGHT ORIGINATING FROM TWO SCENES TO THE EYE OF A VIEWER

(75) Inventor: Yair David, Ramat Hasharon (IL)

(73) Assignee: Planop-Planar Optics Ltd., Rehovot (IL)

( * ) Notice: Subject to any disclaimer, the term of this patent is extended or adjusted under 35 U.S.C. 154(b) by 0 days.

(21) Appl. No.: 09/297,307

(22) PCT Filed: Nov. 10, 1997

(86) PCT No.: PCT/US97/20234

§ 371 (c)(1),
(2), (4) Date: Apr. 29, 1999

(87) PCT Pub. No.: WO98/21612

PCT Pub. Date: May 22, 1998

(51) Int. Cl.[7] .............................................. G02B 5/32
(52) U.S. Cl. ........................... 359/19; 359/15; 351/168
(58) Field of Search ................. 359/15, 34, 630, 359/631, 13, 16, 19, 633; 351/168, 172, 57, 158

(56) References Cited

U.S. PATENT DOCUMENTS

| | | | |
|---|---|---|---|
| 3,564,261 A | * 2/1971 | Hadermann et al. | ........ 250/229 |
| 3,981,561 A | * 9/1976 | Weiss et al. | ............... 359/243 |
| 4,613,200 A | 9/1986 | Hartman | |
| 4,711,512 A | * 12/1987 | Upatnieks | .................. 359/15 |
| 4,869,575 A | * 9/1989 | Kubik | ....................... 359/630 |
| 5,224,198 A | 6/1993 | Jachimowicz et al. | |
| 5,321,547 A | * 6/1994 | Zapp | ......................... 359/431 |
| 5,341,230 A | 8/1994 | Smith | |
| 5,369,415 A | * 11/1994 | Richard et al. | ............... 345/6 |
| 5,416,633 A | * 5/1995 | Michel et al. | ............. 359/410 |

FOREIGN PATENT DOCUMENTS

| | | |
|---|---|---|
| EP | 526067 | 7/1992 |
| JP | 1-296213 | 5/1988 |

* cited by examiner

Primary Examiner—Mark A. Robinson
Assistant Examiner—Alessandro V. Amari
(74) Attorney, Agent, or Firm—Mark M. Friedman

(57) ABSTRACT

An optical system for alternative or simultaneous direction of light from two scenes to the eye of a viewer comprising (a) a first lens (42) having a first focal length; (b) a second lens (44) having a second focal length, the first and second lenses being positioned aside one another in front of one of the eyes of the viewer, such that a single light beam from any of the scenes (48, 50) passes only through one of the first and second lenses; and (c) an optical arrangement for directing incident light originating from the first scene and passing through the first lens into the eye of the viewer, and at the same time, for directing incident light originating from the second scene and passing through the second lens into the eye of the viewer, the optical arrangement being positioned between the first and second lenses and the eye of the viewer.

18 Claims, 9 Drawing Sheets

OPTICAL SYSTEM FOR ALTERNATIVE OR SIMULTANEOUS DIRECTION OF LIGHT ORIGINATING FROM TWO SCENES TO THE EYE OF A VIEWER

This application claims priority from PCT/US97/20234 filed Nov. 10, 1997, which claims priority from U.S. Ser. No. 08/746,526 filed Nov. 12, 1996, which issued on Mar. 3, 1998 as U.S. Pat. No. 5,724,163, and from U.S. Ser. No. 08/753,126 filed Nov. 26, 1996, now abandoned.

FIELD AND BACKGROUND OF THE INVENTION

The present invention relates to an optical system for alternative or simultaneous direction of light originating from two scenes to an eye of a viewer, and more particularly, to an optical system which employs a planar opyics approach for alternative or simultaneous direction of light originating from two scenes to the eye of a viewer. The system according to the invention may thus be used to provide inventive bifocal eyeglasses, using which does not require inconvenient head and eye positioning relative to the viewed scene as associated with using conventional bifocal eyeglasess. The present invention further relates to an optical system for simultaneous direction of light originating from two scenes to an eye or both eyes of a viewer using geometric or planar optic approaches. The system according to the invention does not employ active radiation for display.

As used herein in the specification and claims, the term 'scene' refers to an object or set of objects as perceived by a viewer through passive radiation, i.e., through radiation which comes from outside the system of the present invention.

The passive radiation may for example be radiation reflected or scattered by the object or objects and it may also be radiation which is emitted from the object or objects. In other words, passive radiation is radiation which comes from outside the system of the present invention and which would have perceived by the viewer even without the system of the present invention.

By contrast, the term 'active radiation' as used herein is intended to include radiation which originates from a component of the system in question. Thus, for example, a conventional head-up-display (HUD) system includes a cathode ray tube (CRT), so that the radiation generated by the CRT is active radiation. A view of active radiation as herein defined is defined herein as a display.

The term 'scene' as referred herein specifically excludes any type of a display formed by active radiation, as used for example in HUD systems. The term 'image' as used herein reads upon both scene and display, whereas a real image refers to a scene and a virtual image refers to a display.

Since the system of the present invention includes no source of radiation, all the radiation perceived by the viewer using the system of the present invention is passive radiation. It is to be noted that, as defined herein, in the context of the present invention, even radiation which is emitted, for example, from a television screen or computer monitor, is considered passive radiation since neither the television screen nor the computer monitor is a part of the system of the present invention.

A high percentage of the population is in need of eyeglasses due to various vision defects.

Conventional eyeglasses typically include a frame to support the glasses in a suitable position in front of the eyes of the viewer, and two lenses implemented within the frame, one for each of the eyes of the viewer. Each of the lenses is acquired a focal characteristic to compensate for its specific eye vision defect.

Thus for example, in cases of myopia, which is a vision defect of focus, resulting from too much power in the eye lens and cornea and/or too long an eyeball, the image of a distant object falls ahead of the retina and cannot be focused sharply due to extensive amount of positive focal power, a negative lens is chosen so that its image is formed at the most distant point on which the myopic eye can focus.

On the other hand, in cases of hyperopia, the reverse of myopia which results from too little power in the refracting elements of the eye and/or too short an eyeball, the image of a distant object is formed (when the eye is relaxed) behind the retina. Hyperopia is therefore compensated for by a positive lens.

Myopia and hyperopia are vision defects associated with viewing distant objects. Presibyopia, on the other hand, is an example for a vision defect associated with viewing close objects, which in many cases impairs the ability to read. Presibyopia results from the hardening of the material of the lens which typically comes with age, and leads to a limited ability to focus (accommodate) the eye with respect to close objects. Presibyopia is therefore compensated for by a positive lens which enables a user to comfortably read.

However, in many cases a single eye suffers from both a long distance vision defect such as myopia or hipermyopia limiting its landscape vision capabilities and a short distance vision defect such as presibyopia limiting its reading capabilities.

A person with such a dual eye defect is in need of either two sets of eyeglasses, the first offers corrective optics for the long distance vision defect and the other offers corrective optics for the short distance vision defect, or alternatively, a set of what is known in the art as bifocal eyeglasses which include bifocal lenses, each is in fact the combination of two lenses having given (yet different) focal lengths and optical characteristics, arranged one aside the other. Multifocal eyeglasses are also known although less frequently used due to their high price and the inability of many individuals to accommodate to their use.

Nevertheless, both these solutions suffer limitations. Using two pairs of eyeglasses, one pair for reading and the other for long distance viewing, requires changing the glasses each time a user moves his site from a close to a distant object, and wise versa. Using bi- or multifocal eyeglasses dictates different lines of site for viewing close and distant objects and limits the field of view in both cases. Typically, for reading the user is required to lower his eyes while maintaining a substantially straight forward head position. Should the close object be positioned straight ahead relative to the viewer, in order to sharply view the close object, the viewer is required to tilt his head backwards and at the same time to lower his eyes. All this leads in many cases to head and neck problems, which is the reason why many individuals prefer not to use bifocal eyeglasses.

There is thus a widely recognized need for, and it would be highly advantageous to have, an optical system for alternative or simultaneous direction of light originating from two scenes to the eye of a viewer, as such a system can be used to provide bi- or multi focal eyeglasses, using which does not require inconvenient head and eye positioning relative to the viewed scene.

Many situations exist in which a viewer is interested in viewing scenes located in different locations with respect to the viewer. Examples include but are not limited to (i) taking notes while viewing a blackboard, a lecturer or a display (e.g., a slides screen), in this case the viewer is interested at viewing both his notes, which are typically located on a table or a writing board, and the blackboard, lecturer or display; (ii) drawing while viewing the object to be drawn (e.g., landscape), in this case the viewer is interested at viewing both his drawing board and the drawn object; (iii) typing on a keyboard while viewing the screen, in this case a non professional typist is interested at viewing both the keyboard and the screen; (iv) locking at or reading from a printed matter (e.g., a map, a guide book, etc.) while viewing another scene (e.g., a road, an instrument, etc.), in this case the viewer is interested at viewing both the printed matter and the other scene.

However, since the field of view in which a viewer can focus is relatively narrow, in the above and similar situations the viewer is required to move his eyes site back and forth between the scenes, such that at any given time the viewer sees only one of the scenes. This in turn creates disadvantages since (i) when the viewer sees one scene he may not become aware to a change in the other scene, thus for example, a driver or a pilot, while viewing a road or navigation map, cannot at the same time view the road or sky ahead; and (ii) the viewer finds it difficult to compare between scenes, thus for the painter it is difficult to compare his drawing to the object being drawn, for the typist it is difficult to detect a typological error, for the student it is harder to accurately copy schemes from the blackboard or display into his notes, etc.

There is thus a widely recognized need for, and it would be highly advantageous to have, an optical system for simultaneous direction of light originating from two scenes to the eyes of a viewer.

SUMMARY OF THE INVENTION

According to the present invention there is provided an optical system for alternative or simultaneous direction of light originating from at least two scenes to the eye of a viewer. There is further provided an optical system for simultaneous direction of light originating from two scenes to an eye or both eyes of a viewer which can be used to enable the viewer to simultaneously view a first scene and a second scene. The optical system according to the present invention involves use of only passive radiation originating from the viewed scenes and in sharp contrast to head-up-display (HUD) systems does not employ active radiation.

According to further features in preferred embodiments of the invention described below, the system comprising (a) a first lens having a first focal length; (b) a second lens having a second focal length, the first and second lenses being positioned aside one another in front of one of the eyes of the viewer, such that a single light beam from any of the scenes passes only through one of the first and second lenses; and (c) an optical arrangement for directing incident light originating from the first scene and passing through the first lens into the eye of the viewer, and at the same time, for directing incident light originating from the second scene and passing through the second lens into the eye of the viewer, the optical arrangement being positioned between the first and second lenses and the eye of the viewer.

According to another embodiment of the invention the system comprising (a) a magnifying-collimating eyepiece lens having a short focal length, for magnifying a close scene and for collimating light passing through the magnifying-collimating lens; (b) an optical arrangement for directing incident light originating from the close scene and passing through the magnifying-collimating lens into the eye of the viewer, and at the same time, for directing incident light originating from a distant scene into the eye of the viewer; and (c) a corrective eyepiece lens for compensating for a long distance visual defect, the corrective lens being positioned between the optical arrangement and the eye of the viewer.

According to still further features in the described preferred embodiments the optical arrangement includes a holographic plate.

According to still further features in the described preferred embodiments the holographic plate includes at least one holographic optical element.

According to still further features in the described preferred embodiments the holographic plate includes a first input holographic optical element for permitting incident light passing through the first lens to enter the holographic plate.

According to still further features in the described preferred embodiments the holographic plate includes a first input holographic optical element for permitting incident light passing through the magnifying-collimating lens to enter the holographic plate.

According to still further features in the described preferred embodiments the holographic plate further includes a second input holographic optical element for permitting incident light passing through the second lens to enter the holographic plate.

According to still further features in the described preferred embodiments the holographic plate further includes a second input holographic optical element for permitting incident light originating from the distant scene to enter the holographic plate.

According to still further features in the described preferred embodiments the holographic plate further includes an output holographic optical element for permitting light entering the holographic plate to leave the holographic plate and reach the eye of the viewer.

According to still further features in the described preferred embodiments the optical arrangement includes at least one reflective optical element.

According to still further features in the described preferred embodiments the system further comprising (d) a light blocking mechanism for, at least at a given period of time, blocking light of one of the first and second scenes from arriving onto the eye of the viewer.

According to still further features in the described preferred embodiments the optical system further comprising (d) a light blocking mechanism for, at least at a given period of time, blocking light of one of the close and distant scenes from arriving onto the eye of the viewer.

According to another embodiment of the invention provided are eyeglasses comprising two optical systems as in any of the above described embodiments.

According to another embodiment of the invention provided is a headset for three-dimensional viewing comprising two optical systems including a light blocking mechanism.

According to another embodiment of the invention provided is an optical system to be used by a viewer to acquire a three-dimensional perception of a scene presented by a first image and a second image each of the first and second images contain parallax information of the scene, the system comprising a first holographic plate and a second holographic plate, each of the first and second holographic plates including (a) a body made of a light transmitting material, the body having a first side and a second side; (b) at least one input holographic optical element formed in the first side of the body, the material and each of the input holographic optical elements are selected such that incident light entering the body and having a given direction is diffracted and undergoes substantially total internal reflection; and (c) at least one output holographic optical element formed in the second side of the body, such that light arriving at any of the output holographic optical elements exits the body in a direction substantially similar to the given direction of the incident light; wherein, the first holographic plate is for permitting substantially only light originating from the first image to arrive at one eye of the viewer, whereas the second holographic plate is for permitting substantially only light originating from the second image to arrive at the other eye of the viewer.

According to still further features in the described preferred embodiments each of the holographic optical elements further includes a light blocking mechanism to effect the permissions.

According to further features in preferred embodiments of the invention described below, provided is a method for enabling a viewer to view a first scene and a second scene, the method comprising the steps of (a) providing the viewer with a first eyepiece lens having a first focal length; (b) providing the viewer with a second eyepiece lens having a second focal length, the first and second lenses being positioned aside one another in front of one of the eyes of the viewer, such that a single light beam from any of the scenes passes only through one of the first and second lenses; and (c) providing the viewer with an optical arrangement for directing incident light originating from the first scene and passing through the first lens into the eye of the viewer, and at the same time, for directing incident light originating from the second scene and passing through the second lens into the eye of the viewer, the optical arrangement being positioned between the first and second lenses and the eye of the viewer.

According to further features in preferred embodiments of the invention described below, provided is a method to be used by a viewer to view a close scene and a distant scene, the method comprising th steps of (a) providing the viewer with a magnifying-collimating eyepiece lens having a short focal length, for magnifying the close scene and for collimating light passing through the magnifying-collimating lens; (b) providing the viewer with an optical arrangement for directing incident light originating from the close scene and passing through the magnifying-collimating lens into an eye of the viewer, and at the same time, for directing incident light originating from the distant scene into the same eye of the viewer; and (c) providing the viewer with a corrective eyepiece lens for compensating for a long distance visual defect, the corrective lens being positioned between the optical arrangement and the same eye of the viewer.

According to further features in preferred embodiments of the invention described below, provided is an optical system for enabling a viewer to simultaneously view a first scene and a second scene, both the first and second scenes are perceived by the viewer through passive radiation, the system comprising (a) a head arrangement for mounting the system on the head of the viewer, for positioning the optical system in front of an eye of the viewer; and (b) a beamsplitter being positioned such that light originating from the first scene and light originating from the second scene both are simultaneously directed into the eye of the viewer.

According to still further features in the described preferred embodiments the first scene is a close scene and the second scene is a distant scene, such that light originating from the distant scene is naturally substantially collimated, the system further comprising (c) a collimating lens for collimating light originating from the close scene, the collimating lens being supported by the head arrangement.

According to still further features in the described preferred embodiments the first and second scenes are both close scenes, such that light originating from any of the scenes is a non-collimated light, the system further comprising (c) a first collimating lens for collimating light originating from the first scene, the first collimating lens being supported by the head arrangement; and (d) a second collimating lens for collimating light originating from the second scene, the second collimating lens being supported by the head arrangement.

According to still further features in the described preferred embodiments the system further comprising (c) at least one reflector being supported by the head arrangement, the at least one reflector being for directing light originating from the first scene onto the beamsplitter.

According to still further features in the described preferred embodiments the system further comprising (c) a corrective optical lens for correcting a vision defect of the viewer, the corrective optical lens being positioned between the beamsplitter and the eye of the viewer, the corrective optical lens being supported by the head arrangement.

According to further features in preferred embodiments of the invention described below, provided is a method for enabling a viewer to simultaneously view a first scene and a second scene, both the first and second scenes are perceived by the viewer through passive radiation, the method comprising the step of (a) providing the viewer with a beamsplitter positioned such that light originating from the first scene and light originating from the second scene both simultaneously directed at an eye of the viewer.

According to still further features in the described preferred embodiments the first scene is a close scene and the second scene is a distant scene, such that light originating from the distant scene is naturally substantially collimated, the method further comprising the step of (b) providing the viewer with a collimating lens for collimating light originating from the close scene.

According to still further features in the described preferred embodiments the first and second scenes are both close scenes, such that light originating from any of the scenes is a non-collimated light, the method further comprising the steps of (b) providing the viewer with a first collimating lens for collimating light originating from the first scene; and (c) providing the viewer with a second collimating lens for collimating light originating from the second scene.

According to still further features in the described preferred embodiments the method further comprising the step of (b) providing the viewer with at least one reflector, the at least one reflector being for directing light originating from the first scene onto the beamsplitter.

According to still further features in the described preferred embodiments the method further comprising the step of (b) providing the viewer with a corrective optical lens for correcting a vision defect of the viewer, the corrective optical lens being positioned between the beamsplitter and the eye of the viewer.

According to still further features in the described preferred embodiments the beamsplitter is moveable with respect to the head arrangement for permitting the viewer to adjust the system at viewing the first and second scenes when the viewer moves his head and for permitting the viewer to select another pair of scenes to be simultaneously viewed.

According to still further features in the described preferred embodiments the first and second scenes are both distant, such that light originating from the scenes is naturally substantially collimated.

According to still further features in the described preferred embodiments at least one of the at least one reflectors and the beamsplitter is moveable with respect to the head arrangement for permitting the viewer to adjust the system at viewing the first and second scenes when the viewer moves his head, and for permitting the viewer to select at least one replacement scene to be simultaneously viewed with the second scene.

According to still further features in the described preferred embodiments the beamsplitter and the reflector are formed as a first surface and a second surface, respectively, of a single optical element having a volume.

According to still further features in the described preferred embodiments the reflector is a collimating reflector and the beamsplitter is a collimating beamsplitter, such that light originating from the first scene is collimated by the collimating reflector before reaching the beamsplitter.

According to still further features in the described preferred embodiments the beamsplitter and the at least one reflector are arranged with respect to the first scene and with respect to the eye of the viewer such that the first scene is viewed in a steep angle.

According to still further features in the described preferred embodiments the beamsplitter is a collimating beamsplitter, such that light originating from the first scene is collimated by the collimating beamsplitter before reaching the eye of the viewer.

According to further features in preferred embodiments of the invention described below, provided is a headset for enabling a viewer to simultaneously view a first scene and a second scene comprising two optical systems as described above each of the two systems being positioned in front of one of the eyes of the viewer.

According to further features in preferred embodiments of the invention described below, provided is a headset for enabling a viewer to simultaneously view a first scene with one eye and a second scene with the other eye, the headset comprising an optical systems as described above, the optical system being positioned in front of the one eye of the viewer, the beamsplitter functions substantially only as a reflective surface, so that light originating from the first scene is directed onto the one eye of the viewer while the one eye of the viewer is directed towards the second scene, whereas at the same time, the second eye of the viewer is directed at the second scene.

According to further features in preferred embodiments of the invention described below, provided is an optical system for enabling a viewer to simultaneously view a first scene and a second scene, both the first and second scenes are perceived by the viewer through passive radiation, the system comprising a holographic plate, the holographic plate including (a) a body made of a light transmitting material, the body having a first side and a second side; (b) at least one input holographic optical element formed in the first side of the body, the material and each of the at least one input holographic optical elements are selected such that incident light entering the body and having a given direction is diffracted and undergoes a substantially total internal reflection; and (c) at least one output holographic optical element formed in the second side of the body, such that light arriving at any of the at least one output holographic optical elements exits the body in a direction substantially similar to the given direction of the incident light (i.e., enters from one side of the plate, exits from the other) and reaches an eye of the viewer; wherein, the holographic plate is positioned with respect to the eye of the viewer, and the at least one input and output holographic optical elements are positioned with respect to the body, such that light originating from both the first and second scenes is simultaneously directed into the eye of the viewer.

According to still further features in the described preferred embodiments the body is curved at least at one location.

According to still further features in the described preferred embodiments the first scene is a close scene and the second scene is a distant scene, such that light originating from the distant scene is naturally substantially collimated, the system further comprising (d) a collimating lens for collimating light originating from the close scene.

According to still further features in the described preferred embodiments the first and second scenes are both distant, such that light originating from both scenes is naturally substantially collimated.

According to still further features in the described preferred embodiments the first and second scenes are both close scenes, such that light originating from any of the scenes is a non-collimated light, the system further comprising (d) a first collimating lens for collimating light originating from the first scene, the first collimating lens being positioned between the first scene and the holographic plate; and (e) a second collimating lens for collimating light originating from the second scene, the second collimating lens being positioned between the second scene and the holographic plate.

According to still further features in the described preferred embodiments the system further comprising (d) a collimating lens being positioned between the holographic plate and the eye of the viewer, for collimating light originating from both the first and second scenes.

According to still further features in the described preferred embodiments the system further comprising (d) a corrective optical lens for correcting a vision defect of the viewer, the corrective optical lens being positioned between the holographic plate and the eye of the viewer.

According to further features in preferred embodiments of the invention described below, provided is a headset for enabling a viewer to simultaneously view a first scene and a second scene comprising two optical systems as described above, each of the two systems being positioned in front of one of the eyes of the viewer.

According to further features in preferred embodiments of the invention described below, provided is a headset for enabling a viewer to simultaneously view a first scene with one eye and a second scene with the other eye, the headset comprising an optical systems as described, the optical system being positioned in front of the one eye of the viewer, the system permitting light from the first scene to arrive to the one eye of the viewer, while at the same time blocking light originating from the second scene from arriving at the one eye while the one eye of the viewer is directed towards the second scene, whereas, at the same time, the second eye of the viewer is directed at the second scene.

According to still further features in the described preferred embodiments the first and second scenes form a pair of related scenes, the pair of related scenes is selected from the group of pairs of scenes consisting of a note—a blackboard, a note—a lecturer, a note—a screen, a draw—a drawn object, a keyboard—a screen, a printed matter—screen, a printed matter—a road ahead and a printed matter—sky ahead.

According to still further features in the described preferred embodiments provided is a method for enabling a viewer to simultaneously view a first scene and a second scene, both the first and second scenes are perceived by the viewer through passive radiation, the method comprising the steps of (a) providing the viewer with a holographic plate through which the viewer sees the scenes, the holographic plate including (i) a body made of a light transmitting material, the body having a first side and a second side; (ii) at least one input holographic optical element formed in the first side of the body, the material and each of the at least one input holographic optical elements are selected such that incident light entering the body via at least one input holographic optical element and having a given direction undergoes a substantially total internal reflection; and (iii) at least one output holographic optical element formed in the second side of the body, such that light arriving at any of the at least one output holographic optical elements exits the body in a direction substantially similar to the given direction of the incident light and reaches one of the eyes of the viewer; and (b) positioning the holographic plate with respect to the eye of the viewer, and the at least one input and output holographic optical elements with respect to the body, such that passive light radiation originating from both the first and second scenes is simultaneously directed into the eye of the viewer.

The present invention successfully addresses the shortcomings of the presently known configurations by providing an optical system for alternative or simultaneous direction of light from two scenes to the eye of a viewer, as such an optical system (i) may replace bifocal eyeglasses and be used with more ease and comfort as it requires no change in head positioning, nor a change in the direction at which the eyes of the viewer are directed at, as bifocal eyeglasses require upon changing from long distance to short distance viewing; (ii) may be used for three-dimensional viewing and for (iii) bringing visual information typically outside the field of view of the viewer into that field of view, without the viewer required to change his head positioning and/or eyes direction. The present invention further addresses the shortcomings of the presently known configurations by providing an optical system for simultaneous direction of passive light radiation originating from two scenes to the eye of a viewer which can be used to enable the viewer to simultaneously view pairs of related scenes.

Additional features, objectives and advantages of the optical systems according to the present invention are described in the following sections.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of an optical system for alternative or simultaneous direction of light from at least two scenes to the eye of a viewer, which can be used to provide a viewer with the image of the two or more scenes at different or single time periods. Specifically, the present invention can be used to provide bifocal eyeglasses, using which does not require inconvenient head and eye positioning relative to a viewed scene. According to another embodiment, the present invention is of an optical system for simultaneous direction of light originating from two scenes to an eye or both eyes of a viewer which can be used to enable the viewer to simultaneously view a pair of related scenes. Specifically, this embodiment of the present invention can be used to enable the viewer to be simultaneously aware to changes in any one or both scenes, and to be able to accurately compare the scenes one to the other.

Figure 1:
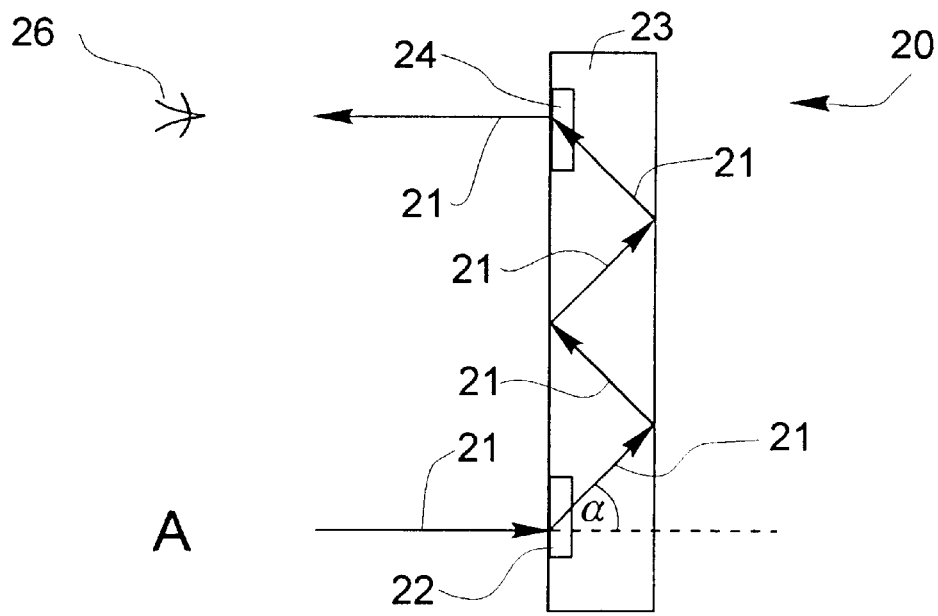
FIG. 1 is a cross section view of a prior art holographic plate.
Figure 2:
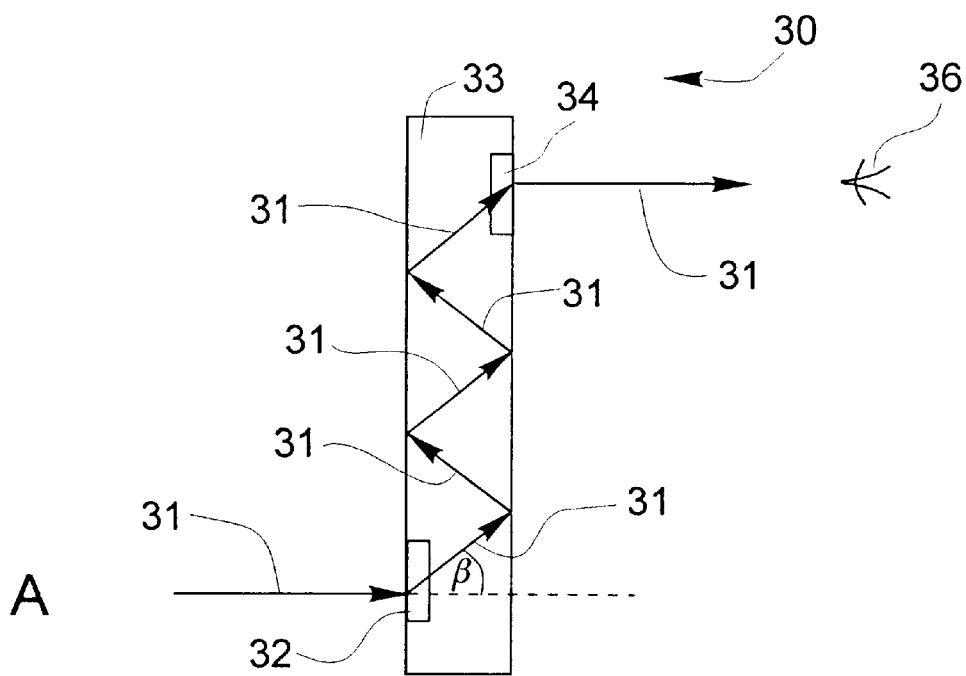
FIG. 2 is a cross section view of another prior art holographic plate which is implemented in various embodiments according to the present invention.

For purposes of better understanding the first embodiment of the present invention, as illustrated in FIGS. 3–8 of the drawings, reference is first made to the construction and operation of conventional (i.e., prior art) holographic plates as illustrated in FIGS. 1–2.

Referring now to the drawings, FIG. 1 illustrates a prior art holographic plate, referred to hereinbelow as plate 20. Plate 20 includes a body 23 made of a light transmitting material such as but not limited to glass, plastic, etc., and further includes an input 22 and output 24 holographic optical elements (also known in the art as diffractive optical elements). The angle $\alpha$ in which incident light (a representative beam of which is indicated by arrows 21) is diffracted passing through input holographic optical element 22 and the material of which plate 20 is made of are selected such that light entering plate 20 undergoes a substantially total internal reflection (as indicated by arrows 21) until impinges on output holographic optical element 24, through which the light leaves (exits) plate 20. Thus, using plate 20, a scene A, light from which arrives at input holographic optical element 22, may be viewed by the eye 26 of a viewer via output holographic optical element 24.

However, a characteristic of prior art holographic plate 20 of FIG. 1, is that the light entering holographic plate 20 is in a direction substantially opposite with respect to the light leaving the plate, or in other words, the scene and the viewer have to be located in the same relation with respect to the plate, as shown in FIG. 1.

As is described in greater detail below, the prior art configuration of FIG. 1, wherein the scene and the viewer are both positioned in the same orientation with relation to the holographic plate is in many cases limiting for the various embodiments of the present invention.

With reference now to FIG. 2, presented is another prior art holographic plate 30 which is implemented in various embodiments of the present invention. Holographic plate 30 is similar to the prior art holographic plate 20 of FIG. 1, yet has a crucial distinction. While using plate 20 of FIG. 1, as described hereinabove, both the viewer and the scene to be viewed should be positioned in a similar orientation with respect to the plate. In sharp contrast, as shown in FIG. 2, while using plate 30, the viewer must take a position opposite to the position of the scene to be viewed in order to view that scene.

Thus, similar to plate 20 of FIG. 1, plate 30 of FIG. 2, includes a body 33 made of a light transmitting material such as but not limited to glass, plastic, etc., and further includes an input 32 and output 34 holographic optical elements. The angle β in which incident light (a representative beam of which is indicated by arrows 31) is diffracted passing through input holographic optical element 32 and the material of which plate 30 is made of are selected such that light entering plate 30 undergoes a substantially total internal reflection (as indicated by arrows 31) until impinges on output holographic optical element 34, through which the light leaves plate 30.

When the phrase 'substantially total internal reflection' is used herein in this document and especially in the claims section below it refers to a total reflection with the limitation that in some cases due to impurities, defective polishing etc., some of the light is not reflected but escapes from the plate. These phenomena are well known in the art. In fact a true total internal reflection (i.e., 100% of the light being reflected) is theoretical. However, loss of up to few percents (e.g., less than 10%, preferably less than 5%, more preferably less than 1%, most preferably less that 0.1%, or less) of the light is tolerated and is included under the definition of 'substantially total internal reflection', as used herein. Furthermore, as well known in the art, the amount of internal reflection (e.g., at different locations) can also be controlled electrically. Such electrically controlled holographic plates fall within the definition of a holographic plate as this term used herein.

Nevertheless, in contrast to plate 20 of FIG. 1, holographic optical elements 32 and 34 of plate 30 are positioned on opposite sides of the plate. Therefore when using plate 30, a scene A taking place on one side of plate 30, light from which arrives at input holographic optical element 32, may be viewed by the eye 36 of a viewer located on the other side of plate 30, via output holographic optical element 34.

It should be noted that although plates 20 and 30 are presented as having a planar configuration, it is well known in the art that curved configurations are also permissible, provided that the curvature is selected such that the internal reflection as described above is not hampered.

Thus in the broad sense, holographic plate 30 includes (a) a body made of a light transmitting material, the body having a first side and a second side; (b) at least one input holographic optical element formed in the first side of the body, the material and each of the input holographic optical elements are selected such that incident light entering the body and having a given direction is diffracted and undergoes substantially total internal reflection; and (c) at least one output holographic optical element formed in the second side of the body, such that light arriving at any of the output holographic optical elements exits the body in a direction substantially similar to the given direction of the incident light, e.g., as shown in FIG. 2. Substantially similar direction as used herein means entry via one side of the plate and exit via the other side.

Additional examples of holographic plates are found for example in A. A. Friesem and Y. Amitai (1996) in "Trends in Optics". A Consortini, Ed. Academic Press, NY, pp. 125–144, which is incorporated by reference as if fully set forth herein. Specifically, various embodiments of holographic plates described in the above cited reference are herein incorporated by reference.

Figure 3A:
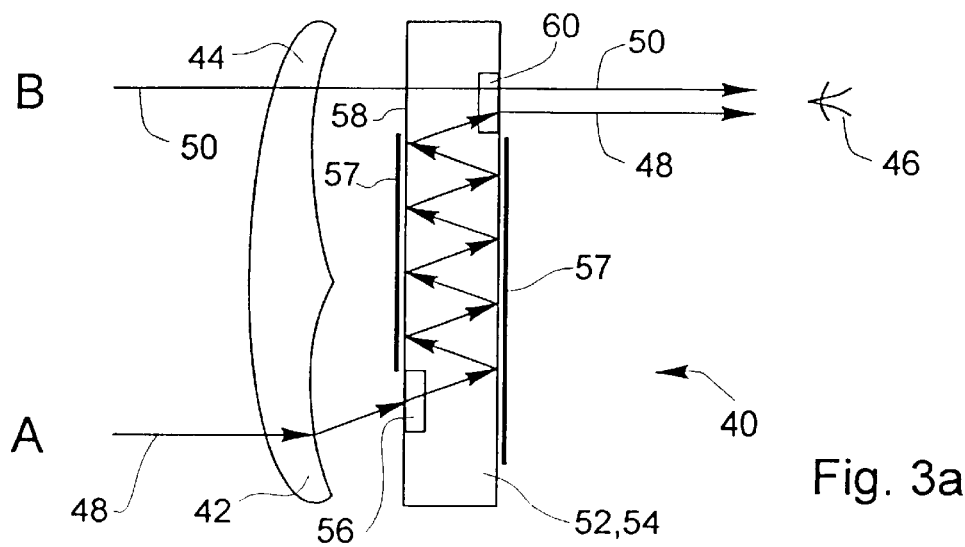
FIGS. 3a–c are cross section views of three embodiments of an optical system according to the present invention.
Figure 3B:
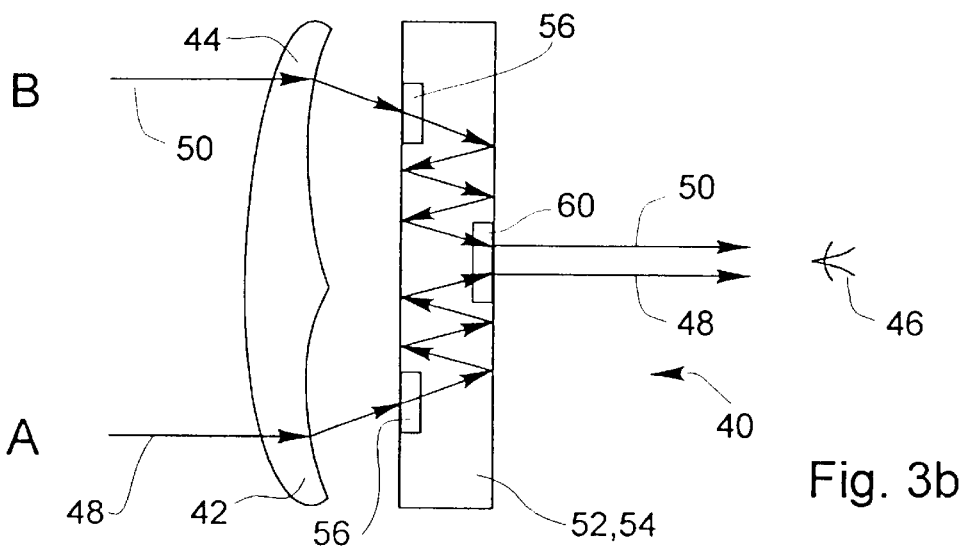
Figure 3C:
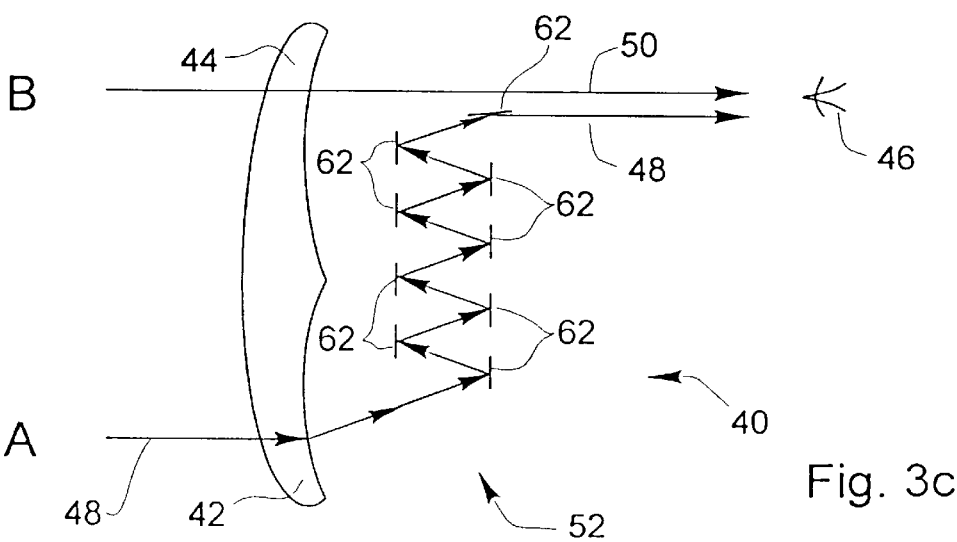

With reference now to FIGS. 3a–c, presented are three optional embodiments of an optical system according to the present invention, referred to hereinbelow as optical system 40. Optical system 40 can be used by a viewer to alternatively or simultaneously view at least a first scene A and a second scene B.

The term 'scene' as used in this document and especially in the claims section below refers to any site visible to the human eye. e.g., moving and motionless objects, displays, images, etc. Furthermore, two scenes such as A and B, as used herein, refer both to two independent scenes, to overlapping scenes and even to a single scene viewed from two slightly different angles. Thus when the phrase "at least two scenes" is used herein it refers to at least two scenes as this term is defined hereinabove.

System 40 includes a first eyepiece lens 42 characterized by a first focal length, and a second eyepiece lens 44 characterized by a second focal length. First 42 and second 44 lenses are positioned aside one another in front of one of the eyes of the viewer (indicated by 46), such that a single light beam (as indicated for example by arrows 48 or 50) passes only through one of the first 42 and second 44 lenses.

It should be noted that lenses 42 and 44 are shown in FIGS. 3a–c and in Figures to follow as components of a bifocal lens. Nevertheless, it will be appreciated by one ordinarily skilled in the art that any two conventional lenses, i.e., not fused into a bifocal lens, are within the scope of the present invention and that there is no intention to limit the scope of the present invention to bifocal configurations as this term is used in the art of ophthalmology. It should be further noted that when the term 'aside' is used herein in this document and especially in the claims section below it refers to any configuration in which lenses 42 and 44 are close to one another. Thus, when used by a viewer, lenses 42 and 44 may be one below (or above) the other, as is exemplified in FIGS. 3a–c, they alternatively may be arranged horizontally side by side (not shown) or in any other close relation to one another, provided that light passes through one of the lenses would not pass through the other.

It will be further appreciated by one ordinarily skilled in the art that for many applications the focal lengths of lenses 42 and 44 is selected such that one lens, say 42, has a short focal lens and is therefore suitable to focus on close scenes, while the other lens, say 44, has a long focal lens and is therefore suitable to focus on distant scenes, as for example is the case in typical bifocal eyeglasses. However, as is detailed below, for other applications, such as for example for three-dimensional viewing of images presenting parallax information of a scene (i.e., each of the images presents the scene from a slightly to moderately different angle, typically as would have been viewed by the two eyes of a single viewer), the focal lengths of any of lenses 42 or 44 may be otherwise selected, in fact for the later purpose the focal lengths of lenses 42 and 44 may be selected equal or substantially equal.

System 40 further includes an optical arrangement 52 for directing incident light (as indicated by arrows 48) from a first scene A, which light first passes through first lens 42, to eye 46 of the viewer, and at the same time, for directing to incident light (as indicated by arrows 50) from a second scene B, which light first passes through second lens 44, to eye 46 of the viewer. According to this embodiment of the invention optical arrangement 52 is positioned between first 42 and second 44 lenses and eye 46 of the viewer.

As will shortly be described, each of FIGS. 3a–c presents a somewhat different configuration of optical arrangement 52, yet the preferred configurations are presented in FIGS. 3a–b, wherein optical arrangement 52 includes a holographic plate 54 similar in operation to holographic plate 30 of FIG. 2.

Holographic plate 54 includes at least one (one in FIG. 3a, two in FIG. 3b) input holographic optical elements 56. Thus, in FIG. 3a, input holographic optical element 56 is for permitting incident light passing through lens 42 to enter holographic plate 54, whereas light passing through lens 44 enters holographic plate 54 in a direct fashion as it impinges plate 54 substantially perpendicular to its outer surface 58. In FIG. 3b, on the other hand, input holographic optical elements 56 are for permitting incident light passing through lenses 42 and 44 to enter holographic plate 54.

It will be appreciated that although in the drawings the lines of sites originating from the different scenes are shown parallel, there is no intention to limit the scope of the present invention to parallel lines of sites, in other words, any two scenes or lines of sites whether parallel or not, are applicable.

In both these cases, however, holographic plate 54 further includes at least one output holographic optical element 60. Output holographic optical element 60 is for permitting light entering holographic plate 54 to leave holographic plate 54 and reach eye 46 of the viewer. Preferably, in locations where holographic plate 54 is not to receive light, it is covered with an opaque cover 57, as shown in FIG. 3a.

As shown in FIG. 3c, optical arrangement 52 may alternatively include a set of reflective optical elements 62 (e.g., mirrors, prisms or a combination thereof as well known in the art of geometrical optics), for directing incident light from any one or both scenes A and B to eye 46 of the viewer. In fact, in FIG. 3c incident light originating from scene A is indeed directed by reflective optical elements 62 into eye 46 of the viewer, whereas incident light from scene B arrives eye 46 directly after passing second lens 44. Nevertheless, a similar set of reflective optical elements, in analogy to FIG. 3b, may be used additionally to direct incident light originating from scene B into eye 46 of the viewer.

Presently, any of the embodiments taking the advantages of planar optics are preferred, since manufacturing and operating planar optics, as for example exemplified in FIGS. 3a–b, as compared with non-planar (i.e., geometrical) optics, as exemplified in FIG. 3c, is much less limiting.

Further details concerning planar optics and especially means of constructing holographic elements can be found in for example A. A. Friesem and Y. Amitai (1996) in "Trends in Optics". A Consortini, Ed. Academic Press, NY, pp. 125–144 and in Jurgen Johns and Susan J. Walker (1990) Two-dimensional array of diffractive microlenses fabricated by thin film deposition. Applied Optics 29:931–936, both are incorporated by reference as if fully set forth herein.

Figure 8:
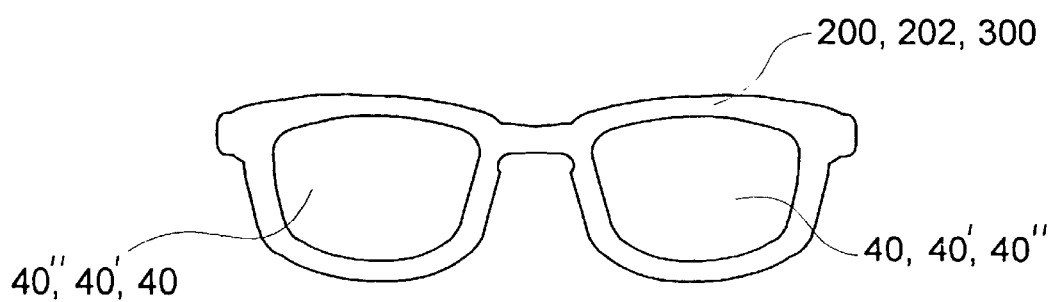
FIG. 8 is a front view of eyeglasses, headset or an optical system for three dimensional viewing, according to the present invention.

In a preferred embodiment of the invention optical system 40 is used in eyeglasses 200, shown in FIG. 8, aimed at enabling view of both close and distant scenes without relocating the head or changing the general direction at which the eyes are directed at, as is associated with using prior art bifocal eyeglasses. To this end, two systems 40, preferably of one of the configurations shown in FIGS. 3a–b, are implemented in a frame 202, preferably a prior art eyeglasses frame, such that a single system 40 is placed in front of each of the eyes of the viewer.

In this case each of systems 40 includes a bifocal lens which includes, as shown in FIGS. 3a–c a lower component in the form of lens 42 having a short focal length for viewing close scene A, and an upper component in the form of lens 44 having a long focal length for viewing a distant scene B. Lenses 42 and 44 in each of systems 40 are selected corrective (compensatory) for a specific viewer according to his specific vision defects and vision limitations as is well known in the art of ophthalmology. The frame is worn by the viewer and therefore light from both scenes A and B arrives at the eyes of the viewer. Yet, when the eyes of the viewer are relaxed, i.e., the eyes of the viewer are accommodated for long distance viewing, scene A is out of focus, whereas scene B is substantially focused on the viewer's retina. On the other hand, when the eyes of the viewer are focused at viewing a close object, i.e., the eyes of the viewer are accommodated for short distance viewing, scene B is out of focus, whereas scene A is substantially focused on the viewer's retina. In both cases the viewer sees one focused and one out of focus scene. Following a training period, the brain of the viewer learns to ignore the scene which is out of focus and refers substantially only the image of the scene in focus. Thus in contrast to the mode prior art bifocal eyeglasses are used, when changing from long to short distance viewing, or vice versa, the viewer is required only to change his eyes focus, yet the viewer is free to keep constant his head position and the direction at which his eyes look.

As highly light transmitive materials having a high index of refraction are now known, the thickness of lenses used in eyeglasses and other optical devices are reduced and their curvatures flattened. Such less curved lenses are highly suitable to implement in eyeglasses according to the invention as they can be prepared with a slightly curved holographic plate adhered to their innerface (facing the eyes).

It should be noted that in a similar fashion more than two lenses can be employed in optical system 40 according to any of its configurations shown in FIGS. 3a–c and the Figures following hereinbelow. In this case light originating from three or more scenes as this term is defined hereinabove may be directed simultaneously, alternatively, in pairs, etc., into the eye of the viewer.

Figure 4A:
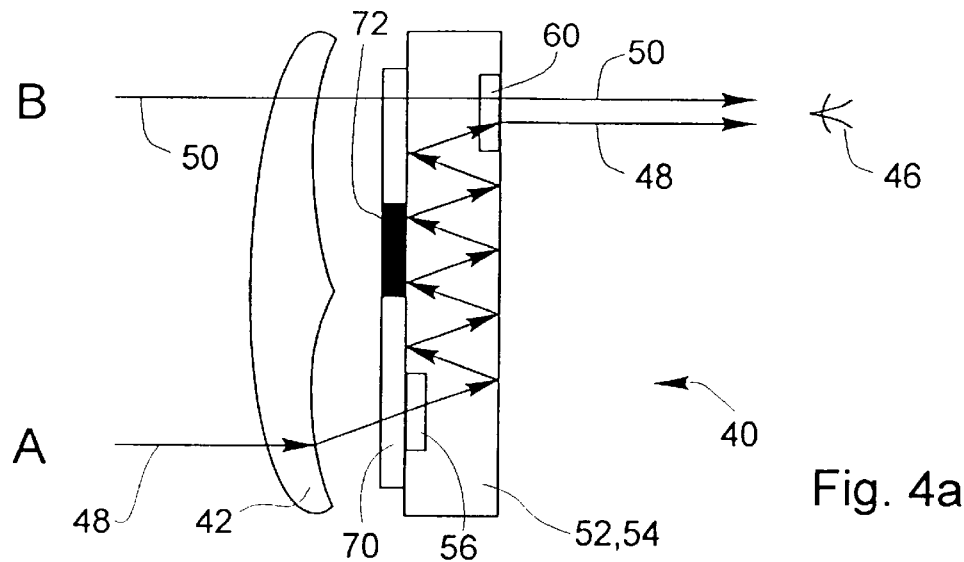
FIGS. 4a–c are cross section views of three operation modes of the optical system of FIG. 3a when equipped with a light blocking mechanism according to the invention.
Figure 4B:
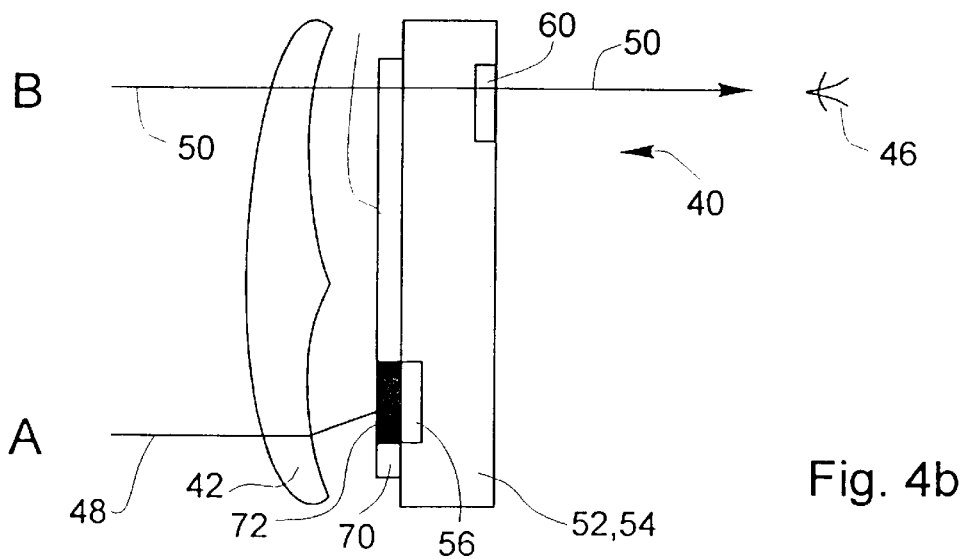
Figure 4C:
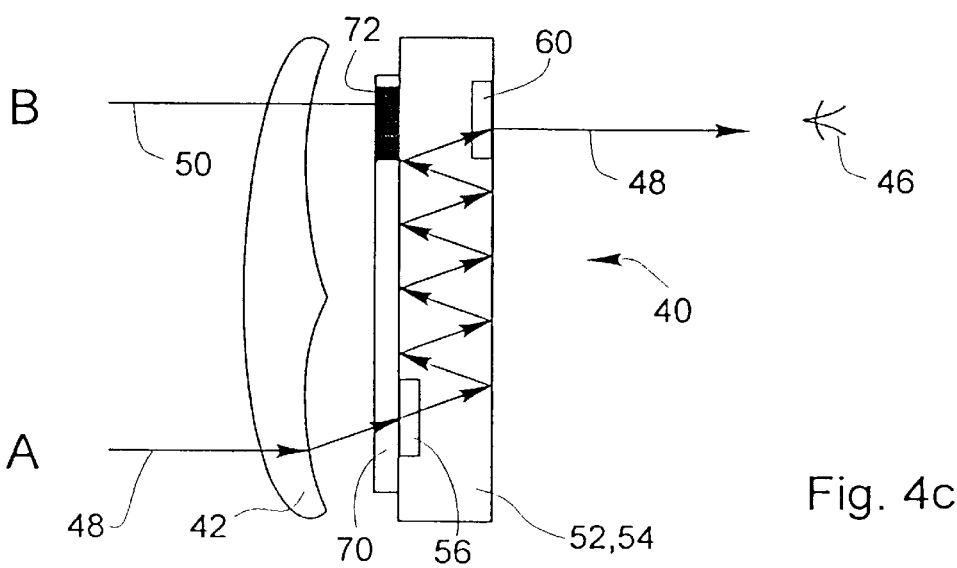

With reference now to FIGS. 4a–c. According to a preferred embodiment of the present invention, optical system 40 further includes a light blocking mechanism 70. Blocking mechanism 70 is for blocking light originating from one of the first and second scenes A and B from arriving to eye 46 of the viewer, during at least a given time period as selected by the viewer. In FIGS. 4a–c the configuration of system 40 as shown in FIG. 3a is reconstructed to further include a blocking mechanism 70. Blocking mechanism 70 includes a light blocker 72, which may preferably acquire three operation modes.

In the first operation mode, as shown in FIG. 4b, light blocker 72 is positioned such that it is blocking light originating from scene A from arriving eye 46 of the viewer.

In the second operation mode, as shown in FIG. 4c, light blocker 72 is positioned such that it is blocking light originating from scene B from arriving eye 46 of the viewer.

Whereas, in the third operation mode, as shown in FIG. 4a, light blocker 72 is positioned such that it is not blocking light originating from either scene A or B from arriving eye 46 of the viewer. Therefore, in the third mode of operation, system 40 functions essentially as described with reference to FIG. 3a above.

Thus, as shown in FIG. 4b, in the first operation mode, eye 46 of the viewer sees only scene B; as shown in FIG. 4c, in the second operation mode, eye 46 of the viewer sees only scene A; whereas in the third operation mode, as shown in FIG. 3a, eye 46 of the viewer sees both scenes A and B.

This embodiment of the optical system according to the present invention is suitable for example for viewers who cannot accommodate to ignore the out-of-focus scene as described above. Such viewers may select the scene they see simply by translating light blocker 72 along light blocking mechanism 70 from one operation mode to another.

It will be appreciated by one ordinarily skilled in the art that (i) light blocking mechanism 70 may be implemented in any of the configurations of system 40 described with reference to FIGS. 3a–c; (ii) light blocking mechanism 70 may be located at any location relative to lenses 42 and 40 and optical arrangement 52, for example light blocking mechanism 70 may be located in front of lenses 42 and 44 or between optical arrangement 52 and eye 46 of the viewer; and (iii) a light blocking mechanism 70 having any combination of only two operation modes of the three operation modes described hereinabove may be useful for some viewers or for some applications.

Figure 5:
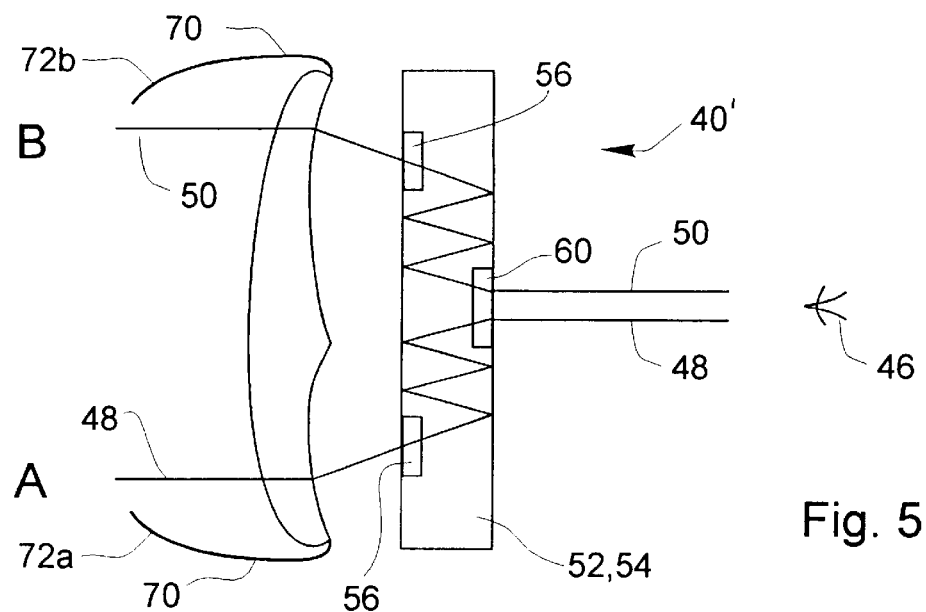
FIG. 5 is a cross section view of the optical system of FIG. 3b when equipped with a second type of light blocking mechanism, according to the invention.

With reference now to FIG. 5. In FIG. 5 the configuration of system 40 shown in FIG. 3b is reconstructed to further include another type of blocking mechanism 70. Blocking mechanism 70 of FIG. 5 includes light blockers 72a and 72b, implemented in a relation relative to lenses 42 and 44, respectively, such that upon rotation of each of blockers 72a and/or 72b, light from scenes A and/or B, respectively, is blocked from arriving into eye 46 of the viewer.

In another preferred embodiment of the invention, as shown in FIG. 8, optical system 40 is used in headset 300 aimed for three-dimensional viewing of two images A and B of a single scene, taken from two angles, which images A and B contain parallax information of the single scene. It should be noted that in the description of the present embodiment of the invention, light originating from image A behaves as light originating from scene A of the former descriptions and that light originating from image B behaves as light originating from scene B of the former descriptions.

To this end two systems 40, preferably of one of the configurations shown in FIGS. 3a–b, are implemented within a suitable frame, preferably a prior art headset frame (not shown), such that a system 40 is placed in front of each of the eyes of the viewer. In this case, each of systems 40 includes a first component in the form of lens 42 having a given, relatively short, focal length, and a second component in the form of lens 44 having a substantially similar focal length. In this case, both lenses are preferably magnifying and collimating lenses. However, it should be noted that in this case lenses 42 and 44 are not necessarily employed as correctives (compensatives) for vision defects. The frame is worn by the viewer which accommodates blocking mechanisms 70 of both systems 40 such that one of his eyes sees substantially only light originating from image A, whereas his other eye sees substantially only light originating from image B, such that a three-dimensional perception of the scene is sensed by the viewer.

Figure 6A:
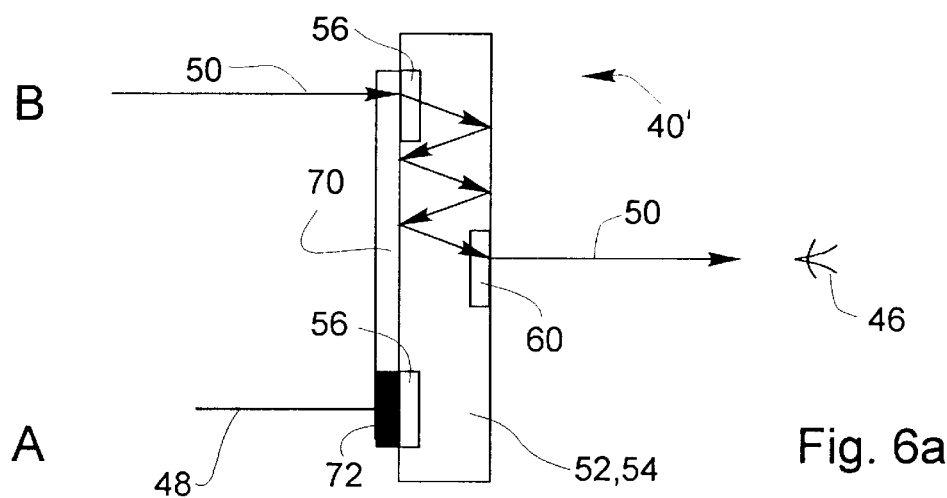
FIGS. 6a–b are cross section views of two operation modes of an optical system for three-dimensional viewing, according to the invention.
Figure 6B:
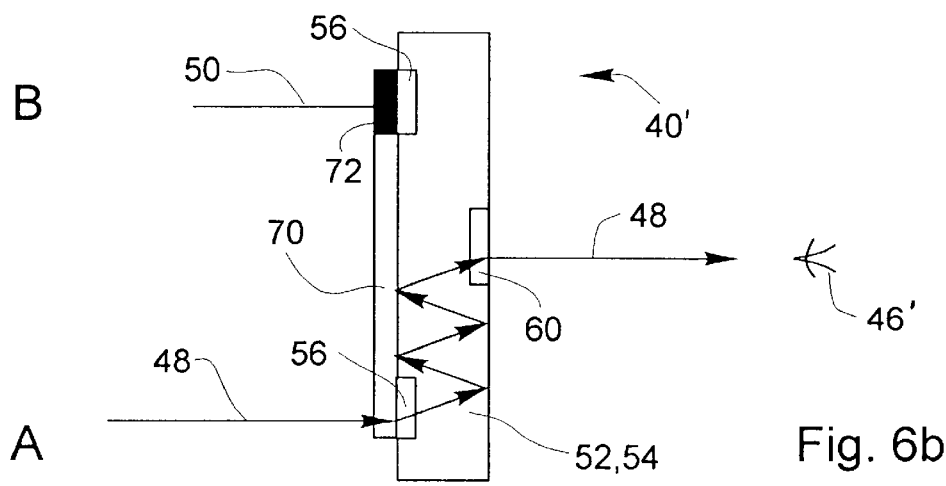

In fact, for the purpose of three-dimensional viewing, system 40 may be reduced to not include any lenses altogether. Such a reduced system, referred hereinbelow as system 40', in two operative modes, is shown in FIGS. 6a–b. System 40' includes all the components described above for the configuration of system 40 shown in FIG. 3b, yet system 40' is devoid of lenses. Optical system 40' can be used by a viewer to simultaneously view a first image A with one of his eyes, say 46, and a second image B with his other eye, say 46'. Thus system 40' includes an optical arrangement 52 for directing incident light (as indicated by arrows 48) from a first image A to eye 46' of the viewer, and at the same time, for directing incident light (as indicated by arrows 50) from a second image B to the other eye 46 of the viewer. In a preferred configurations presented in FIGS. 6a–b optical arrangement 52 includes a holographic plate 54. Holographic plate 54 preferably includes two input holographic optical elements 56 (in analogy to FIG. 3b). Input holographic optical elements 56 are for permitting incident light to enter holographic plate 54. As in this embodiment of the invention no lenses are employed, input holographic optical elements 56 are preferably selected such that they limit the field of view to their corresponding image A or B. Holographic plate 54 further includes at least one output holographic optical elements 60. Output holographic optical element 60 is for permitting light entering holographic plate 54 to leave holographic plate 54 and reach eyes 46 and 46' of the viewer. For three-dimensional viewing optical system 40' further includes a light blocking mechanism 70. Blocking mechanism 70 is for blocking light originating from first and second images A and B, respectively, from arriving to eyes 46 and 46' of the viewer, respectively, or vice versa, depending on the type of parallax information contained within images A and B. In a preferred embodiment, blocking mechanism 70 includes a light blocker 72, which may preferably acquire three operation modes as described above with respect to FIGS. 4a–c, two are shown in FIGS. 6a–b.

Thus, as shown in FIG. 6b, in the first operation mode, eye 46 of the viewer sees only image B, whereas as shown in FIG. 6b, in the second operation mode, the other eye 46' of the viewer sees only image A.

Should images A and B be arranged with respect to the viewer in a predefined way, such that a left image (i.e., an image taken through a left angle with respect to the scene), say image A, is positioned to be seen by the left eye of the viewer, eye 46' in this case, and a right image (i.e., an image taken through a right angle with respect to the scene), say image B, is positioned to be seen by the right eye of the viewer, eye 46 in this case, then system 40' may be reduced not to include light blocking mechanism 70 and to include a single input holographic optical element 56, which is positioned in a first case, as shown in FIG. 6a, to enable light (as indicated by arrows 50) from image B to arrive at eye 46, and in a second case, as shown in FIG. 6b, to enable light (as indicated by arrows 48) from image B to arrive at eye 46'.

Thus according to the present invention provided is an optical system to be used by a viewer to acquire a three-dimensional perception of a scene presented by a first image and a second image each of the first and second images contain parallax information of the scene. This system includes a first and second holographic plates, each includes a body made of a light transmitting material. Each further includes at least one input holographic optical element formed in the first side of the body, the material of which the body is made of and each of the input holographic optical elements are selected such that incident light entering the body and having a given direction is diffracted and undergoes substantially total internal reflection as this term is defined hereinabove. Each of the first and second plates further includes at least one output holographic optical element formed in the second side of the body, such that light arriving at any of the output holographic optical elements exits the body in a direction substantially similar to the given direction of the incident light. The system is constructed such that the first holographic plate permits substantially only light originating from the first image to arrive at one eye of the viewer, whereas the second holographic plate permits substantially only light originating from the second image to arrive at the other eye of the viewer. To effect these permissions, each of the holographic plates preferably further includes a light blocking mechanism.

In yet another embodiment of the present invention, optical system 40 may be used to bring information out side of the field of view of the viewer into that field of view. For example, a driver of a vehicle (or a pilot of an aircraft, etc.), whose eyes are directed at the road (sky) ahead, may be equipped with a pair of systems 40 in front of his eyes to enable a simultaneous vision of both the road (sky) ahead and of the information panel and/or mirror information typically located below or above the driver's (pilot's) field of view. As for the three-dimensional viewing embodiments described hereinabove, in this case as well lenses are optional but are not essential.

Figure 7A:
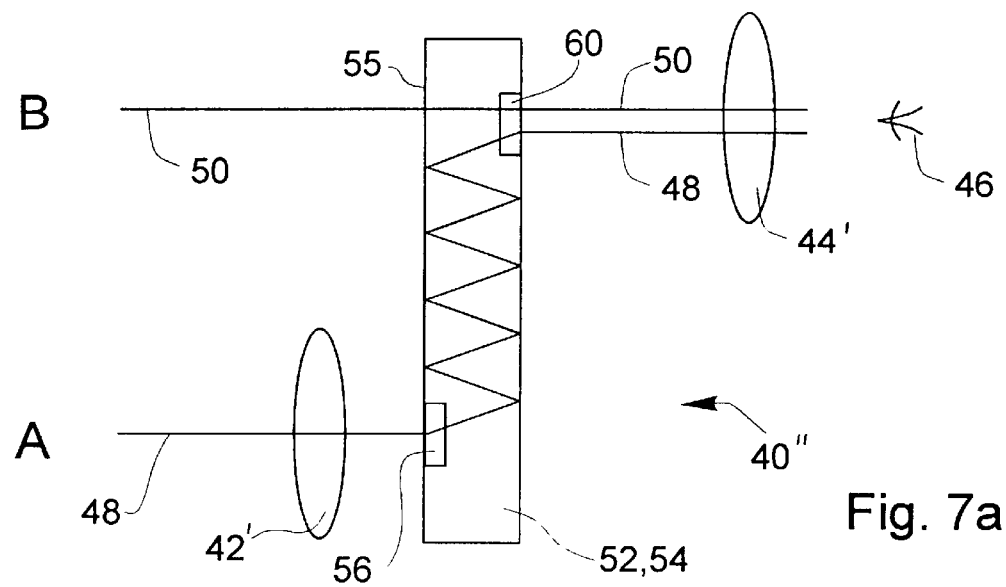
FIGS. 7a–b are cross section views of two possible configurations of an optical system for simultaneous or alternative viewing of a close and/or a distant scene, according to the invention.
Figure 7B:
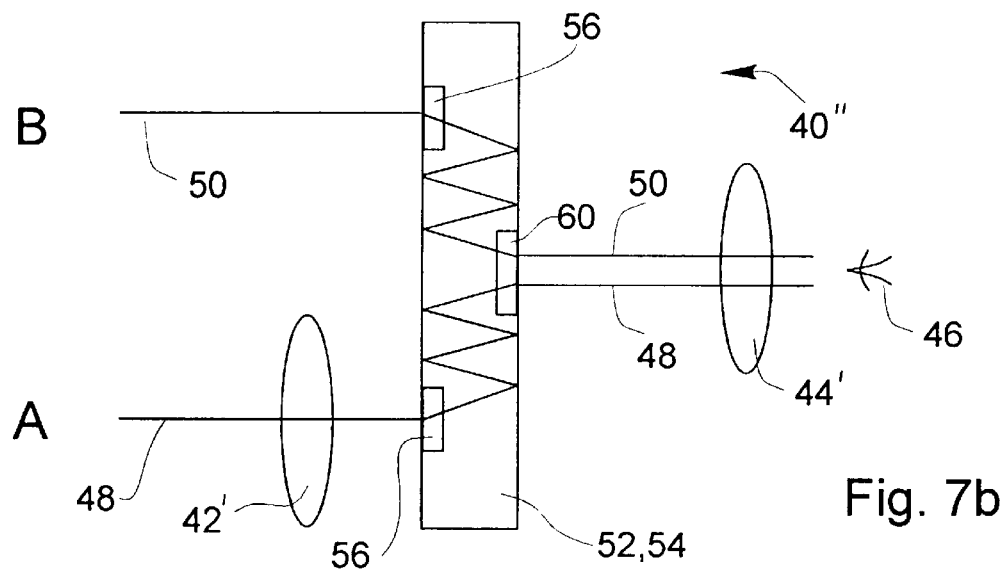

With reference now to FIGS. 7a–b. According to another preferred embodiment of the present invention provided is an optical system referred to hereinbelow as system 40". System 40" can be used to provide eyeglasses, as, for example, shown in FIG. 8, indicated therein by 200, aimed at enabling view of both close and distant scenes without relocating the head or changing the general direction at which the eyes are directed at, which eyeglasses are easier to manufacture as compared with glasses based on the various configurations of system 40 as each of their eyepieces includes only one (as opposed to two) costume-made lens.

FIGS. 7a–b present two optional embodiments for optical system 40" according to the present invention. Optical system 40" can be used by a viewer to alternatively or simultaneously view a close scene A and a distant scene B. System 40" includes a magnifying-collimating eyepiece lens 42' which collimates light passing therethrough. Magnifying-collimating lens 42' is preferably characterized by a relatively short focal length (e.g., in the range of 25–40 cm which is suitable for reading). Collimating-magnifying lens 42' is preferably of a conventional type which is commercially available as a basic optical element and is therefore not of a costume-made nature.

System 40" further includes an optical arrangement 52 preferably in the form of a holographic plate 54 for directing incident light (as indicated by arrows 48) from a close scene A, which light first passes through magnifying-collimating lens 42, to eye 46 of the viewer, and at the same time, for directing incident light (as indicated by arrows 50) from a distant scene B to the same eye 46 of the viewer. It is clear that optical arrangement 52 may include reflective optical elements, such as elements 62 shown in FIG. 3c, although at present this configuration is less preferred due to the advantages of planar optics as compared with classic geometrical optics.

Holographic plate 54 includes at least one (one in FIG. 7a, two in FIG. 7b) input holographic optical elements 56. Thus, in FIG. 7a, input holographic optical element 56 is for permitting incident light arriving from close scene A, first passing through lens 42', to enter holographic plate 54, whereas light originating from scene B enters holographic plate 54 in a direct fashion, as it impinges plate 54 substantially perpendicular to its outer surface 58. In FIG. 7b, on the other hand, input holographic optical elements 56 are for permitting incident light originating from both scene A and B to enter holographic plate 54.

In both these cases, however, holographic plate 54 further includes at least one output holographic optical element 60. Output holographic optical element 60 is for permitting light entering holographic plate 54 to leave holographic plate 54 and reach eye 46 of the viewer.

System 40" further includes a corrective eyepiece lens 44' typically having a longer focal length. Corrective lens 44' is for compensating (correcting) for long distance vision defects and is therefore adjusted to a specific eye 46 of a specific viewer. Corrective lens 44 is located between eye 46 of the viewer and output holographic optical elements 60. Light arriving at corrective lens 44' from either scene A and/or B is collimated. This is the case since light originating from close scene A is collimated by magnifying-collimating lens 42', whereas light originating from distant scene B is substantially collimated in nature.

According to the construction of system 40" as described hereinabove, only one custom-made lens (i.e., lens 44') is required to enable a viewer suffering from both short and long distance vision defects to comfortably view simultaneously or alternatively both close A and distant B scenes. It is clear that like system 40, system 40" may be supplemented with a light blocking mechanism (e.g., similar to light blocking mechanism 70 shown in FIGS. 4a–c) to facilitate differential viewing of close A and distant B scenes. Thus, system 40" enjoy all the advantages described above with respect to system 40, yet system 40" enjoys one additional advantage due to the fact that only a single costume-made lens (i.e., lens 44') is required, as opposed to two costume-made lenses (e.g., lenses 42 and 44 of FIGS. 3a–b and 4a–c) which are required in system 40.

The optical system according to the second embodiment of the present invention involves use of passive radiation originating from the viewed scenes, and in sharp contrast to head-up-display (HUD) systems does not employ active radiation (i.e., a display) as a part of the system.

Figure 9:
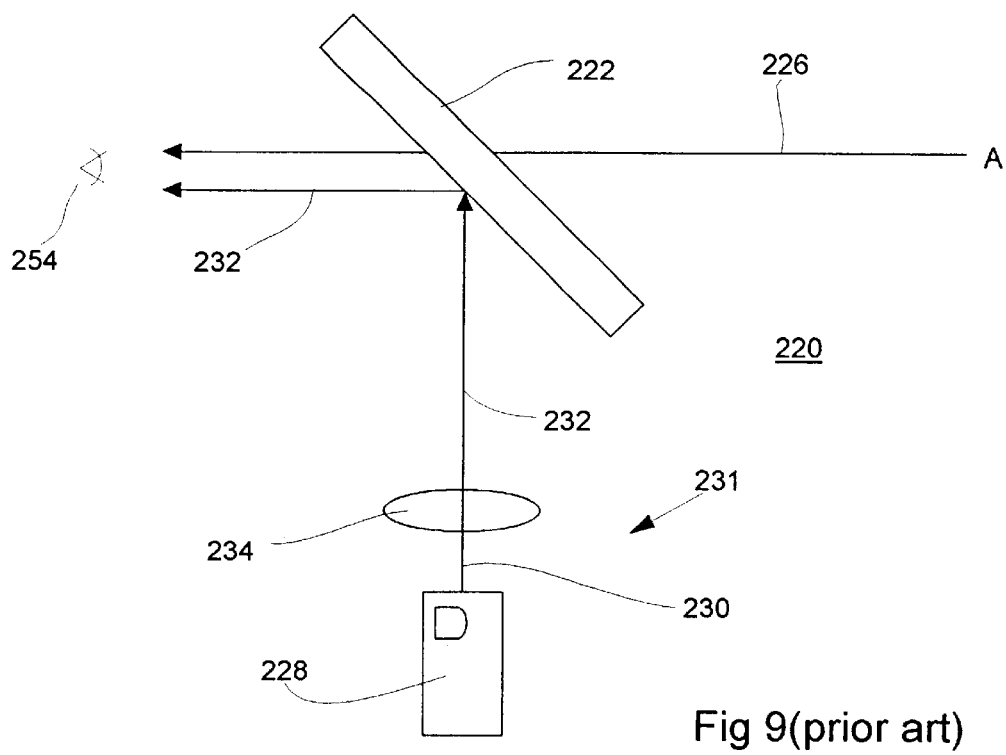
FIGS. 9–11 are cross section views of three prior art head-up-display (HUD) systems.
Figure 10:
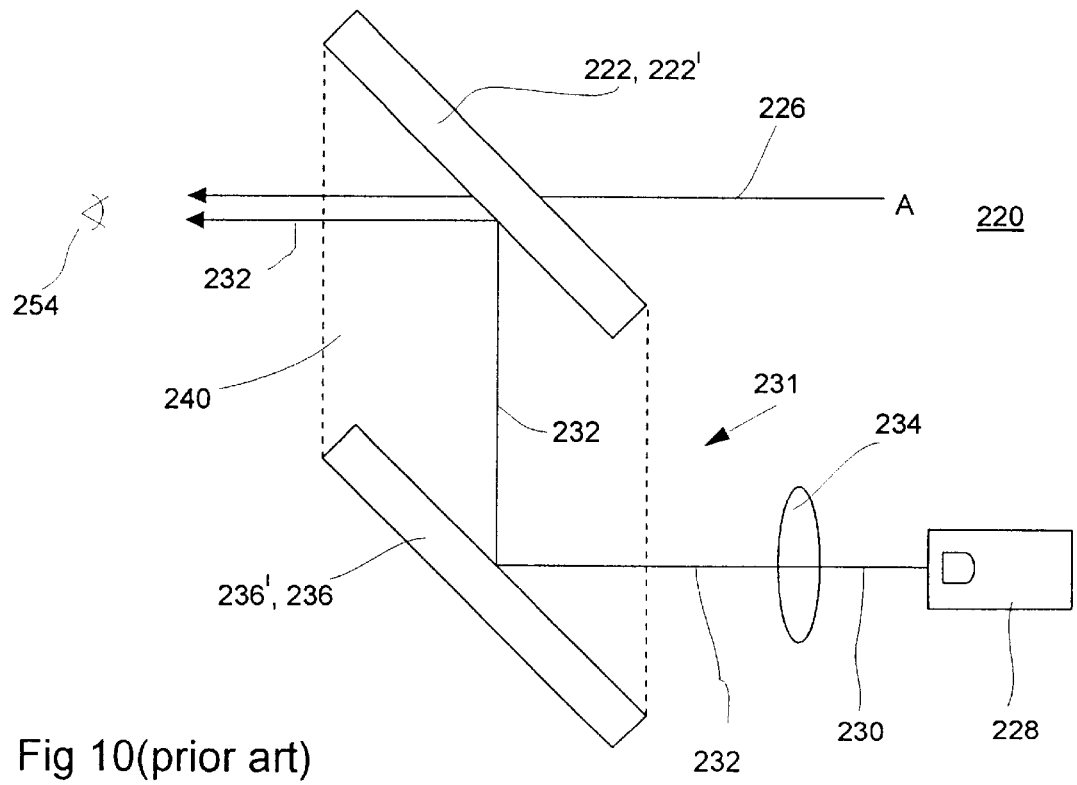
Figure 11:
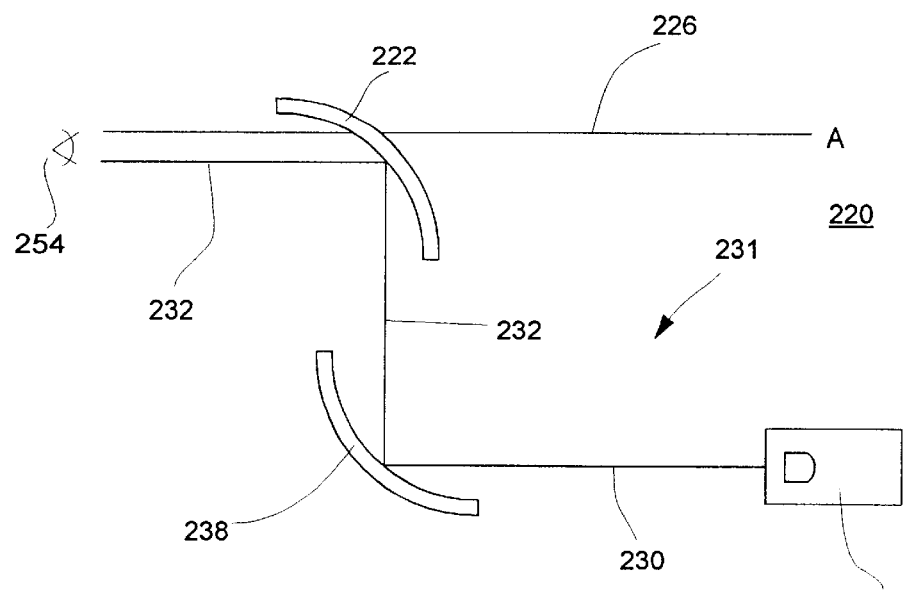

For purposes of better understanding the second embodiment of the present invention, as illustrated in FIGS. 12–17 of the drawings, reference is now made to the construction and operation of a conventional (i.e., prior art) head-up-display (HUD) system as illustrated in FIGS. 9–11.

Thus, a conventional HUD system, referred to hereinbelow as system 220, includes a beamsplitter 222, which functions as a combiner. Combiner 222 is positioned with respect to the eye of the viewer, indicated by 224, such that collimated passive light radiation, as indicated by line of site 226, originating from a distant scene A, reaches eye 224 of the viewer essentially unaffected. HUD system 220 further includes an active display device 228. Device 228 is typically a cathode ray tube (CRT). Device 228 presents a display, as indicated by D. To this end, device 228 emits (typically non-collimated) active light radiation, as indicated by line of site 230. As is described hereinbelow, system 220 includes an optical arrangement 31 capable of (i) collimating that light, as indicated by line of site 232, and (ii) directing the collimated light 232 to combiner 222 and from there into eye 224 of the viewer. Thus the viewer simultaneously sees collimated light originating from both scene A and display D.

Conventional HUD system 220 may be constructed in several configurations, three of which are presented in FIGS. 9–11.

As shown in FIG. 9, optical arrangement 231 includes a collimating lens 234. In the configuration of FIG. 9, device 228 and lens 234 are colinearly arranged such that active non-collimated light radiation 230 emitted from device 228 passes through collimating lens 234, collimates and continues in a substantially unchanged general direction toward combiner 222 and then reflected by combiner 222 to eye 224 of the viewer.

As shown in FIG. 10, optical arrangement 231 includes a collimating lens 234 as before and further includes a reflector (e.g., a mirror or prism) 236. In the configuration of FIG. 10, device 228 and lens 234 are colinearly arranged such that active non-collimated light radiation 230 emitted from device 228 passes through collimating lens 234, collimates, then the collimated light, now indicated by 232, arrives at reflector 236, reflected toward combiner 222 and then reflected by combiner 222 to eye 254 of the viewer. It is clear that the positioning of lens 234 and reflector 236 may vary such that the light is first reflected and only then collimated and that additional reflectors may be used to direct the light from device 228 to combiner 222, should device 228 be otherwise positioned with respect to other components of system 220.

As shown in FIG. 11, optical arrangement 231 includes a collimating reflector 238 for providing a combined effect of collimation and reflection as achieved by collimating lens 234 and reflector 236 of the second configuration shown in FIG. 10 and described hereinabove. In the configuration of FIG. 11, device 228 and collimating reflector 238 are so arranged such that active non-collimated light radiation 230 emitted from device 228 is reflected and, at the same time, collimated by collimating reflector 238, then the collimated light, now indicated by 232, arrives at combiner 222, which is a collimating combiner accommodated to the curve of collimating reflector 238, and then the light is reflected by collimating combiner 222 to eye 254 of the viewer. It is clear that additional reflector(s) may be used to direct the light from device 228 to combiner 222, should device 228 be otherwise positioned with respect to other components of system 220.

In some cases the optical elements as described above for system 220 are all included in a single optical element which has surfaces, each functions as specified above. Thus for example in the configuration of FIG. 10, combiner 222 and reflector 236 may be two surfaces of a single element 240 (shown in broken lines) through which volume light travels from a reflecting surface 236' to a combining surface 222'. A HUD system in accordance with the above direction is disclosed in for example JP 497193 (abstract).

Some prior art HUD systems are stationary while others are implemented (at least partially) within a headset, a helmet, etc., such that the system is at all times positioned in front of the eyes of the viewer. However, all prior art HUD systems are limited to simultaneous presentation of one scene which is perceived through passive light radiation and one display which is perceived through active light radiation, as these terms are defined in the Background section above. Non of the presently known HUD systems is directed at simultaneous vision of two scenes, as this term is defined above, which is the basis for the present invention. In other words, in HUD systems each eye of the viewer simultaneously sees one real image formed due to passive radiation arriving at the eyes of the viewer and one virtual image formed due to active radiation arriving at the eyes of the viewer. In most cases light from both images is naturally or optically substantially or fully collimated such that both images can be viewed sharply while the eyes of the viewer are substantially relaxed (i.e., not accommodated for close distance vision).

The principles and operation of an optical system according to the present invention may be better understood with reference to the following drawings and accompanying descriptions.

Figure 12:
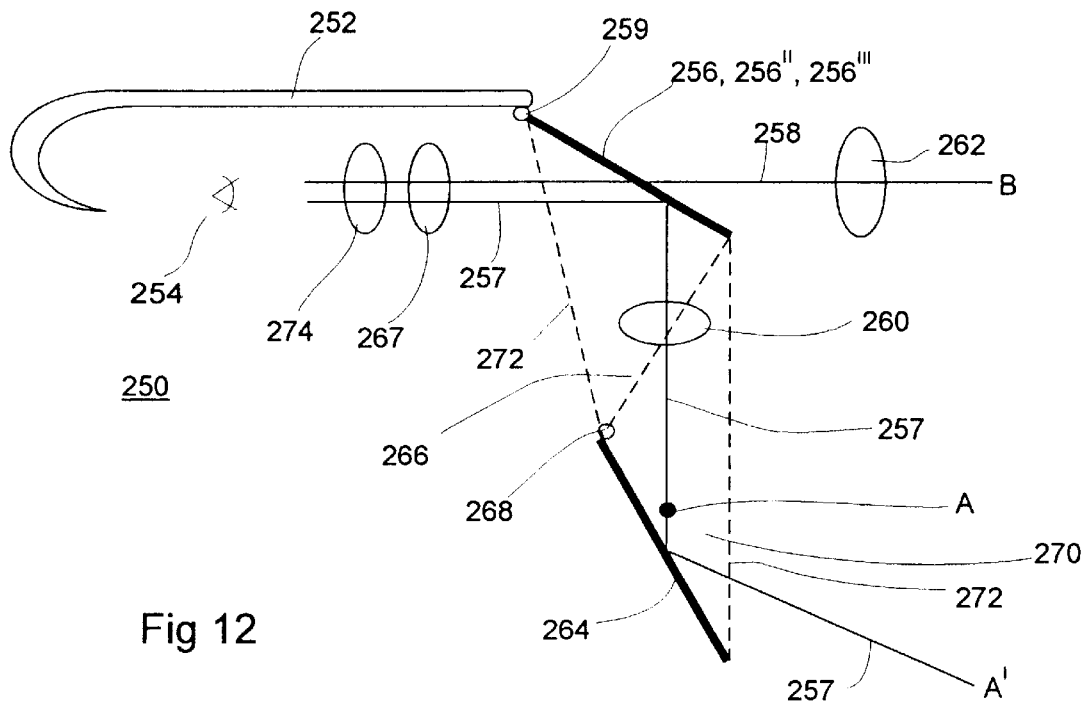
FIGS. 12 and 13 are cross section views of two embodiments of an optical system according to the present invention, wherein geometric optic principles are employed.
Figure 13:
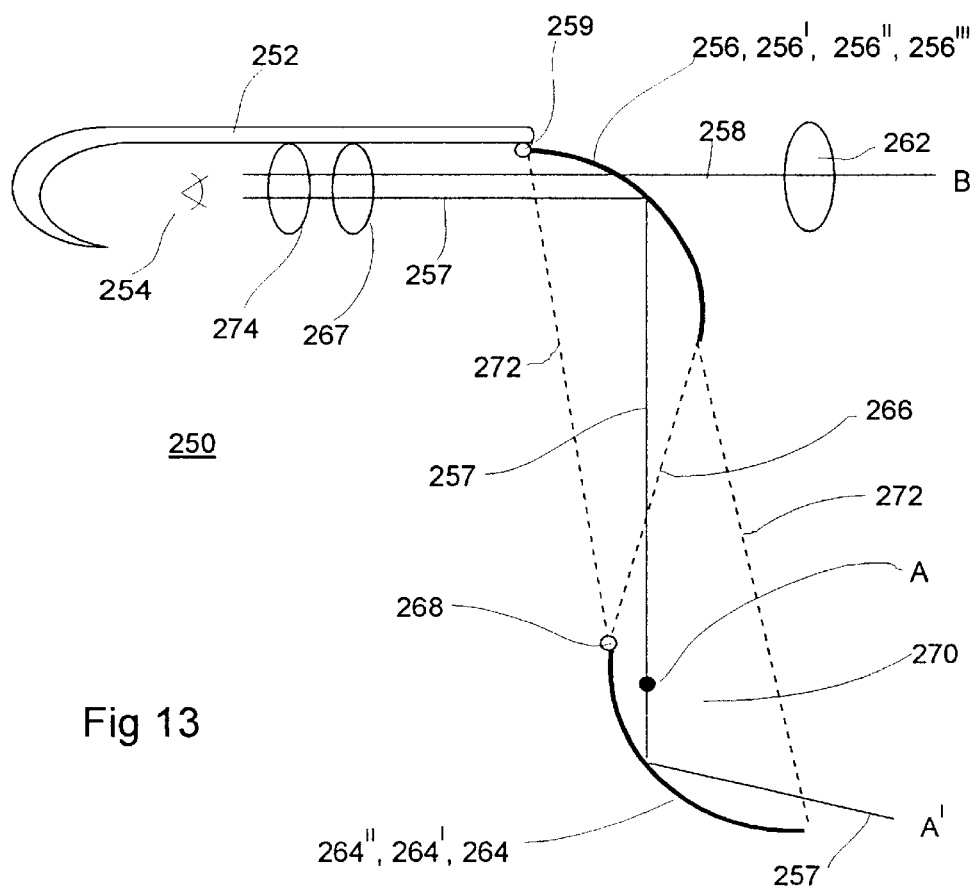

With reference now to FIGS. 12–13, presented are few embodiments of the optical system according to the present invention, referred to hereinbelow as system 250.

System 250 is for enabling a viewer to simultaneously view a first scene as indicated by A (or A') and a second scene as indicated by B, both scenes A (or A') and B are perceived by the viewer through passive radiation as this term is defined above in the Background section above. System 250 as herein described is for the use of one eye of the viewer. In its minimal configuration system 250 includes a head arrangement 252 for mounting system 250 onto the head of the viewer and for positioning system 250 in front of an eye 254 of the viewer. In most embodiments two systems 250 are employed, one for each of the eyes of the viewer. In these cases, a single head arrangement 252 is sufficient to engage other components of the two systems. In FIGS. 12–13 head arrangement 252 is shown similar to an earpiece of eyeglasses. However, head arrangement 252 may acquire many other configurations such as but not limited to a headset, a helmet, or any other arrangement capable of securing system 250 close to and in front of the eyes of a viewer, all as well known in the art.

It will be appreciated by one ordinarily skilled in the art that by enlarging the components of system 250, system 250 may be of a type not engaged to the viewer's head while used. In this case system 250 does not include a head arrangement, instead its other components as herein described are preferably directly or indirectly engaged within a suitable housing (not shown), whereas a single system 250, depending on its size, may simultaneously serve both eyes of the viewer.

In the minimal configuration, system 250 further includes a beamsplitter 256 which is positioned such that light originating from first scene A, as indicated by line of site 257, and light originating from second scene B, as indicated by line of site 258, are both simultaneously directed into eye 254 of the viewer. Thus, beamsplitter 256 functions as a combiner.

In a preferred embodiment, beamsplitter 256 is moveable (e.g., translatable, rotatable, or both) with respect to head arrangement 252, for permitting the viewer to adjust the system at viewing first A (or A') and second B scenes when the viewer moves his head, and for permitting the viewer to select another pair of scenes (not shown) to be simultaneously viewed. Moving beamsplitter 256 may for example be effected by a first hinge 259 connecting beamsplitter 256 to head arrangement 252.

In many cases first scene A (or A') is a close scene and second scene B is a distant scene. The term 'close scene' is used herein to indicate a scene located within a distance from the viewer, such that the viewer is required to focus (accommodate) his eyes to view the close scene. Thus, close scenes are typically located within a range of few centimeters to few meters from the viewer. The term 'distant scene' is used herein to indicate a scene located within a distance from the viewer, such that the viewer is substantially not required to focus (accommodate) his eyes to view the distant scene. Thus, distant scenes are typically located within a range of e.g., 5–10 meters or more e.g., 100–1000 meters or more from the viewer. In cases where first scene A (or A') is a close scene and second scene B is a distant scene, light originating from distant scene B is naturally substantially collimated (as it arrives from a far distance), whereas light originating from close scene A (or A') is not collimated. This creates a problem to the viewer to simultaneously sharply view both scenes, since at a given time his eye 254 is either focused and capable of sharply seeing close scene A (or A'), yet not capable of sharply seeing distant scene B, or alternatively it is relaxed and therefore capable of sharply seeing distant scene B, yet not capable of sharply seeing close scene A (or A'). Therefore, as shown in FIG. 12, in a preferred embodiment of the invention system 250 further includes a collimating lens 260 for collimating light originating from close scene A (or A') before it arrives at beamsplitter 256. Collimating lens 260 is supported directly or indirectly (e.g., via other components of system 250 such as beamsplitter 256) by head arrangement 252 (not shown). As shown in FIG. 13, instead of collimating light originating from close scene A (or A') via a collimating lens, the light can be collimated by selecting beamsplitter 256 to be a collimating beamsplitter 256'.

However, in other cases both scenes A (or A') and B are distant, such that light originating from both scenes A (or A') and B is naturally substantially collimated. In this case no further collimation is required, yet as to allow system 250 to be versatile, collimation is still preferred.

Still in other cases, both first A (or A') and second B scenes are close scenes, such that light originating from any of scenes A (or A') and B is a non-collimated light. In this case it is for some applications preferred that system 250 further includes both first collimating lens 260 (FIG. 12) or collimating beamsplitter (FIG. 13) for collimating light originating from first scene A (or A'), and a second collimating lens 262 for collimating light originating from second scene B, second collimating lens 262 is directly or indirectly supported by head arrangement 252.

Yet, for other applications it is preferred not to include collimation all together. This is the case, for example, when a viewer desires to simultaneously receive light radiation from two scenes, yet to sharply focus only on one of the scenes, while the other scene is not in focus, yet will attract the viewers attention should a change thereat take place.

Nevertheless, in a preferred embodiment, a collimating lens 67 located between beamsplitter 256 and eye 254 of the viewer is used to collimate whatever light passing through system 250 prior to its perception by the viewer.

Since any of first A (or A') or second B scenes may be located in any location with respect to the viewer, e.g., the first scene may be located at A or at A', and since while viewing first scene A after its reflection from beamsplitter 256 it is perceived by the viewer in an upside down orientation, in a preferred embodiment of the invention system 250 further includes at least one reflector 264. Each of reflector(s) 264 is directly or indirectly supported by head arrangement 252. As shown in FIGS. 12 and 13, a single reflector 264 is used, which single reflector 264 is indirectly supported by head arrangement 252 by being connected via a neutral optical element 266 to beamsplitter 256, which is in this case supported by head arrangement 252. Thus, reflector(s) 264 are for directing light originating from first scene A' onto beamsplitter 256. However, in some cases, as shown in FIG. 13, it is preferred that reflector 264 itself is capable of collimating light. To this end a collimating reflector 264' may be of choice.

It is important for many applications that at least one of reflector(s) 264 and beamsplitter 256 is moveable with respect to head arrangement 252 for permitting the viewer to adjust system 250 at viewing first A (or A') and second B scenes, when the viewer moves his head, and for permitting the viewer to select at least one replacement scene (not shown) to be simultaneously viewed with any of the scenes. To this end system 250 may be further equipped with a second hinge 268 connecting between reflector 264 and neutral optical element 266.

In another embodiment of the invention, beamsplitter 256 and reflector 264 are formed as a first surface 256" and a second surface 264", respectively, of a single optical element 270 having a volume, as indicated by dotted lines 272.

Optical system 250 as so far described is suitable for viewers having normal eye vision capabilities (not suffering from eye vision defects). However system 250 may also be used by viewers suffering from eye vision defects. For example, in cases of myopia, which is a vision defect of focus, resulting from too much power in the eye lens and cornea and/or too long an eyeball, the image of a distant object falls ahead of the retina and cannot be focused sharply due to extensive amount of positive focal power, a negative lens is chosen so that its image is formed at the most distant point on which the myopic eye can focus. On the other hand, in cases of hyperopia, the reverse of myopia which results from too little power in the refracting elements of the eye and/or too short an eyeball, the image of a distant object is formed (when the eye is relaxed) behind the retina. Hyperopia is therefore compensated for by a positive lens. Myopia and hyperopia are vision defects associated with viewing distant objects. Presibyopia, on the other hand, is an example for a vision defect associated with viewing close objects, which in many cases impairs the ability to read. Presibyopia results from the hardening of the material of the lens which typically comes with age, and leads to a limited ability to focus (accommodate) the eye with respect to close objects. Presibyopia is therefore compensated for by a positive lens which enables a user to comfortably read. Conventional eyeglasses typically include a frame to support the glasses in a suitable position in front of the eyes of the viewer, and two lenses implemented within the frame, one for each of the eyes of the viewer. Each of the lenses is acquired a focal characteristic to compensate for its specific eye vision defect.

For a viewer who is in need for eyeglasses, system 250 may be devised such that head arrangement 252 is in the form of attachments (not shown) to be attached to the frame of the eyeglasses. Alternatively, system 250 may further include a corrective optical lens 274 for correcting a vision defect of the viewer, corrective optical lens is positioned between beamsplitter 256 and eye 254 of the viewer and is directly or indirectly supported by head arrangement 252 (not shown).

As mentioned above system 250 as so far described is for use by one of the eyes of the viewer, say eye 254.

Nevertheless, in most cases it is preferred that each of the eyes of the viewer is supplemented with an independent system 250. Therefore, according to a preferred embodiment of the invention provided is a headset (e.g., a helmet) for enabling a viewer to simultaneously view first A (or A') and second B scenes, the headset includes two optical systems 250 according to any of the embodiments described hereinabove, each of the two systems 250 is positioned in front of one of the eyes of the viewer.

In some cases it is preferred that each of the eyes of the viewer will be able to view a different scene. To this end, the headset may include only one system 250 positioned in front of one of the eyes of the viewer, say eye 254. In this case, if both eyes are directed at one scene, say second scene B, and if beamsplitter 256 functions substantially only as a reflective surface 256''', i.e., it substantially does not pass light originating from second scene B and substantially totally reflects light originating from first scene A (or A'), so that light originating from first scene A (or A') is directed onto that one eye (254) of the viewer while it is directed towards second scene B, then eye 254 perceives scene A (or A'), whereas at the same time, the other eye directly perceived scene B.

The very same effect can be achieved using the former headset described hereinabove in which two systems 250, one for each of the eyes of the viewer are implement. This however calls for use of light blocking mechanisms so arranged as to block line of sight 258 from being perceived by one of the eyes of the viewer and line of sight 257 from being perceived by the other eye. Light blocking mechanisms (e.g., light shutters) are well known in the art, and are further described herein.

Figures 14A, 14B, 14C:
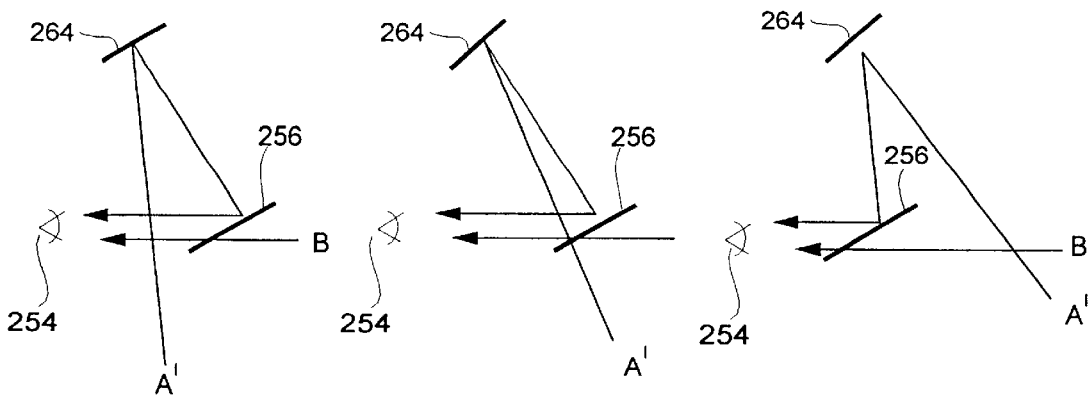
FIGS. 14a–c are schematic depictions of three alternative arrangements of a beamsplitter and a reflector implemented in the optical system of the present invention, to enable the viewer to view the first scene in a steep angle and natural orientation.

With reference now to FIGS. 14*a–b*. In HUD systems which contain a reflector to direct light from a display (e.g., a CRT display) to a beamsplitter which functions as a combiner, the display is in some cases displayed upside down or as a mirror image of the real display. In HUD systems this is not a real limitation since the display itself can be altered (e.g., displayed upside down or as a mirror image) such that the viewer perceives the display as normally would have been perceived (e.g., right side up, natural image).

This effect however, forms a serious limitation for a system which is used to view scenes of passive light radiation. This is the case since the viewer has no control of the scene as when a display is viewed.

For this reason, in a preferred embodiment of the invention, beamsplitter 256 and reflector(s) 264 are arranged with respect to first scene A' and with respect to eye 254 of the viewer such that first scene A' is perceived by the viewer as a scene naturally oriented. Few such arrangements are schematically depicted in FIGS. 12–13 and described hereinabove. Nevertheless, the arrangements of FIGS. 12–13 which enable viewing first scene A' in its natural orientation, permit viewing first scenes, e.g., first scene A', located in shallow angles with respect to the horizon (e.g., about 0–70° below the horizon), yet restrict viewing first scenes e.g., first scene A, located in steep angles with respect to the horizon (e.g., about 70–90° below the horizon).

The arrangements presented in FIGS. 14*a–c* are characterized by positioning reflector 264 above beamsplitter 256, and having the lower side of beamsplitter 256 closer to eye 254 of the viewer. These arrangements therefore permit both viewing first scenes (e.g., scene A) at steep angles and perception of the scene in its natural orientation.

Optical system 250 is suitable and is preferably used to simultaneously perceive a pair of related scenes. Related scenes as referred to herein are scenes which take place in different locations with respect to the viewer, which therefore, without using an optical instrument, cannot be simultaneously sharply seen, yet there is an advantage for such scenes to be simultaneously seen. Such pairs of scenes include but are not limited to a note—a blackboard, a note—a lecturer, a note—a screen, a draw—a drawn object, a keyboard—a screen, a printed matter—screen, a printed matter—a road ahead and a printed matter—sky ahead. The listed pairs of scenes are further described in the Background section above.

Still referring to FIGS. 12–14, according to the present invention also provided is a method for enabling a viewer to simultaneously view a first scene and a second scene, both the first and second scenes are perceived by the viewer through passive radiation. According to preferred embodiments the method includes the following step (a) providing the viewer with a beamsplitter 256 positioned such that light originating from first scene A and light originating from second scene B are both simultaneously directed at eye 254 of the viewer. Preferably beamsplitter 256 is moveable for permitting the viewer to adjust the system at viewing first A (or A') and second B scenes when the viewer moves his head, and for permitting the viewer to select two other scenes (not shown) to he simultaneously viewed. In some cases first scene A (or A') is a close scene and second scene B is a distant scene, such that light originating from distant scene B is naturally substantially collimated. In these cases, the method preferably further includes the step of providing the viewer with a collimating lens 260 for collimating light originating from close scene A (or A'). In other cases first A (or A') and second B scenes are both distant, such that light originating from scenes A (or A') and B is naturally substantially collimated. Yet in other cases, first A (or A') and second B scenes are both close scenes, such that light originating from any of the scenes is a non-collimated light. In these cases the method preferably further includes the steps of providing the viewer with a first collimating lens 260 for collimating light originating from first scene A (or A'), and preferably further providing the viewer with a second collimating lens 262 for collimating light originating from second scene B.

According to a preferred embodiment the method further includes the step of providing the viewer with at least one reflector 264 for directing light originating from first scene A' onto beamsplitter 256. Preferably, at least one of reflector(s) 264 and beamsplitter 256 is moveable with respect to one another for permitting the viewer to adjust viewing first A' and second B scenes when the viewer moves his head and for permitting the viewer to select at least one replacement scene (not shown) to be simultaneously viewed with the second scene. In a preferred embodiment beamsplitter 256 and reflector 264 are formed as a first surface 256'' and a second surface 264'', respectively, of a single optical element 270 having a volume. According to preferred embodiments of the invention reflector 264 is a collimating reflector 264' and beamsplitter 256 is a collimating beamsplitter 256', such that light originating from first scene A' is collimated by collimating reflector before reaching beamsplitter 256'.

According to a preferred embodiment of the method of the present invention, beamsplitter 256 and reflector(s) 264 are arranged with respect to first scene A and with respect to eye 254 of the viewer such that first scene A is viewed in a steep angle and natural orientation.

According to another preferred embodiment of the method of the present invention, the method further includes the step of providing the viewer with a corrective optical lens 274 for correcting a vision defect of the viewer, corrective optical lens 274 is positioned between beamsplitter 256 and eye 254 of the viewer.

According to another preferred embodiment of the method of the present invention, system 250 is engaged within a head arrangement 252 to support system 250 in place in front of an eye of the viewer. Preferably, two system 250 are supported by a single head arrangement 252 in a fashion similar to eyeglasses. In another presently less preferred embodiment, system 250 is engaged within a suitable housing, such that a single system 250 is simultaneously used by both eyes of the viewer.

System 250 as hereinabove described employ principles of geometric optics to simultaneously direct light originating from two scenes to an eye or both eyes of the viewer. The same can be achieved using the principles of planar optics. Planar optics enjoy an advantage as compared with geometric optics since in many cases most or all optical functions can be achieved using a single optical element which therefore needs not be optically and physically adjusted with respect to other elements or needs to be adjusted with respect to fewer elements. This results in better optical precision and less effort needed for manufacturing.

Figure 15:
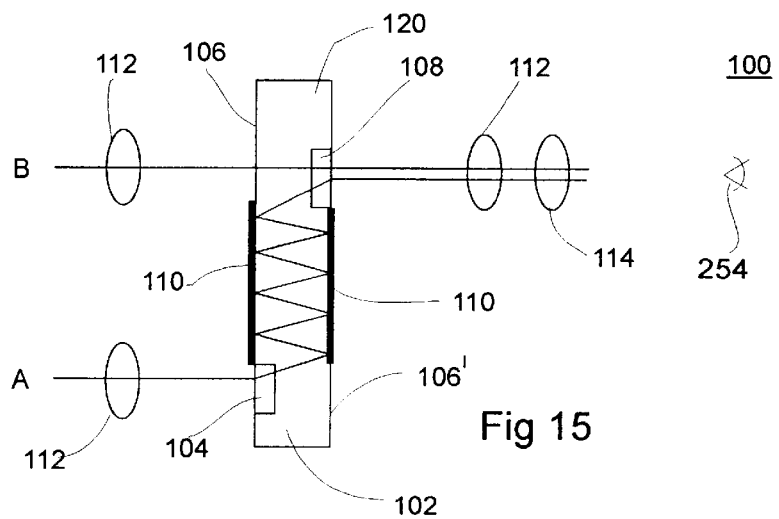
FIGS. 15 and 16 are cross section views of two embodiments of the optical system according to the present invention, wherein planar optic principles are employed.
Figure 16:
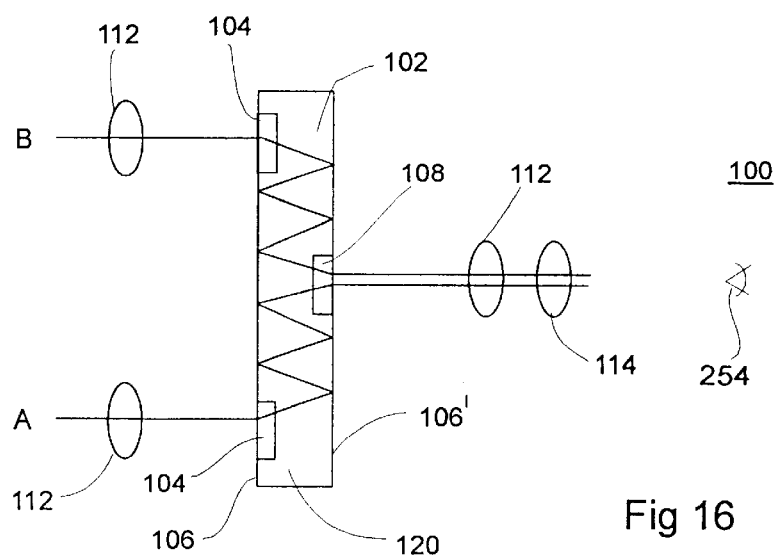

With reference now to FIGS. 15–17, presented are two optional embodiments of an optical system according to the present invention, referred to hereinbelow as optical system 100. Optical system 100 can be used by a viewer to simultaneously view a first scene A and a second scene B.

System 100 includes a holographic plate 102 which includes at least one (one in FIGS. 15 and 17a–c, two in FIG. 16) input holographic optical elements 104. Thus, in FIGS. 15 and 17a–c, input holographic optical element 104 is for permitting incident light originating from scene A to enter holographic plate 102, whereas light originating from scene B enters holographic plate 102 in a direct fashion as it impinges plate 102 substantially perpendicular to its outer surface 106. In FIG. 16, on the other hand, input holographic optical elements 104 are for permitting incident light originating from both scenes A and B to enter holographic plate 102.

As well known in the art, a holographic plate is constructed to include a body 120 made of a light transmitting material, body 120 has a first side 106 and a second side 106'. In a preferred embodiment, input holographic optical elements 104 are formed in first side 106 of body 120. The material of which body 120 is made off and each of input holographic optical element(s) are selected such that incident light entering body 120 and has a given direction is diffracted and undergoes a substantially total internal reflection.

Figures 17A, 17B, 17C:
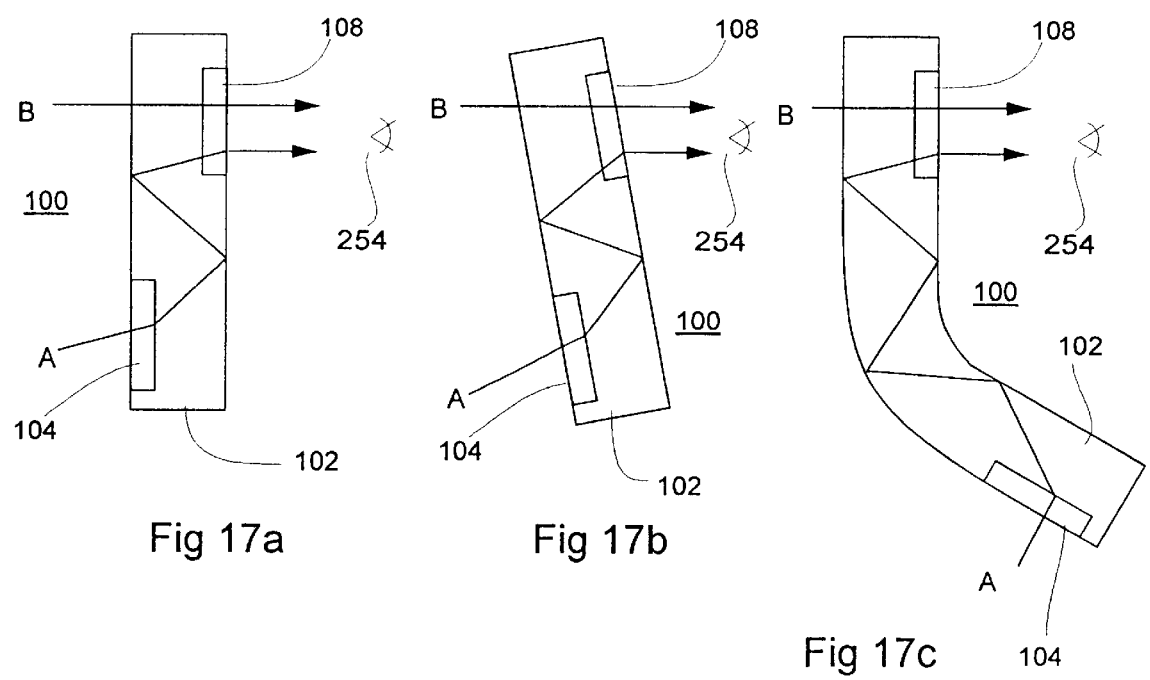
FIGS. 17a–c are cross section views of three optional configurations of the optical system of FIG. 15.

In both these cases (FIGS. 15 and 17a–c and FIG. 16), however, holographic plate 102 further includes at least one output holographic optical element 108. Output holographic optical element 108 is for permitting light entering holographic plate 102 to leave holographic plate 102 and reach eye 254 of the viewer. Preferably, in locations where holographic plate 102 is not to receive light, it is covered with an opaque cover 110, as shown in FIG. 15. Output holographic optical element(s) are formed in second side 106' of body 120, such that light arriving at any of output holographic optical element(s) exits body 120 in a direction substantially similar to the given direction of the incident light and reaches eye 254 of the viewer, e.g., as shown in FIGS. 15–17. Substantially similar direction as used herein means entry via one side 106 of plate 102 and exit via the other side 106'.

Holographic plate 102 is positioned with respect to eye 254 of the viewer, and input and output holographic optical element(s) are positioned with respect to body 120, such that light originating from both first A and second B scenes is simultaneously directed into eye 254 of the viewer. As shown in FIGS. 1 7a–c, (i) light originating from these scenes may arrive system 100 from various directions, yet system 100 is suitable for simultaneously directing the light into eye 254 of the viewer; (ii) system 100 and in particular plate 102 may acquire various orientations with respect to eye 254 of the viewer and (iii) as shown in FIG. 17c, plate 102 may be curved at one or more regions such that the angle in which light from both scenes A and B can still simultaneously enter plate 102 is broadened. In the later case, the curve should not affect the substantially total internal reflection characteristic of plate 102.

Further details concerning planar optics and especially means of constructing holographic elements can be found in for example A. A. Friesem and Y. Amitai (1996) in "Trends in Optics". A Consortini, Ed. Academic Press, NY, pp. 125–144 and in Jurgen Johns and Susan J. Walker (1990) Two-dimensional array of diffractive microlenses fabricated by thin film deposition. Applied Optics 29:9231–9236, both are incorporated by reference as if fully set forth herein.

In a preferred embodiment of the invention optical system 100, like system 250 described hereinabove, and for similar reasons, includes collimating lenses 112. For example, a pair of collimating lenses 112 may be positioned between each of scenes A and B and plate 102. Alternatively and preferably a single collimating lens 112 may be positioned between plate 102 and eye 254 of the viewer.

Also similar to system 250 as described hereinabove, system 100 may further include a corrective optical lens 114. Alternatively it may be adjusted to be implemented on eyeglasses used by viewers suffering vision defects, all as detailed above with respect to system 250. Additional features of system 250, e.g., a head arraignment, a housing etc., may also be included in system 100. Furthermore, a headset including two systems 100 is also within the scope of the present invention. In the later case each of systems 100 is positioned close and in front of one of the eyes of the viewer. Optical system 100 is thus suitable and is preferably used to simultaneously perceive a pair of related scenes as this term is defined hereinabove with respect to system 250. As for system 250, the headset may be employed to enable the viewer to simultaneously view first scene A with one of his eyes and second scene B with his other eye. In this case the headset includes a single optical systems 100 positioned in front of one of the eyes of the viewer, say eye 254, for permitting light substantially only from first scene A to arrive that eye 254, while at the same time for blocking light originating from second scene B from arriving eye 254, although that eye 254, as the other eye of the viewer, is directed towards second scene B.

As highly light transmitive materials having a high index of refraction are now known, the thickness of lenses used in eyeglasses and other optical devices are reduced and their curvatures flattened. Such less curved lenses are highly suitable to implement as corrective optical lenses according to the invention, as they call be prepared with a slightly curved holographic plate adhered to their innerface. A blocking mechanism as describe herein, may also be implemented in system 100 for the purpose of blocking light from one scene, say A, from reaching one of the eyes of the viewer, say eye 254, and light from the other scene, say B, from reaching the other eye of the viewer, such that each eye of the viewer perceives a different scene.

While the invention has been described with respect to a limited number of embodiments, it will be appreciated that many variations, modifications and other applications of the invention may be made.

What is claimed is:

1. An optical system for enabling a viewer to simultaneously view a first scene and a second scene, both the first and second scenes are perceived by the viewer through passive radiation, the system comprising a holographic plate, said holographic plate including:
   (a) a body made of a light transmitting material, said body having a first side and a second side;
   (b) at least one input holographic optical element formed in said first side of said body, said material and each of said at least one input holographic optical elements are selected such that incident light entering said body via at least one input holographic optical element and having a given direction undergoes a substantially total internal reflection; and
   (c) at least one output holographic optical element formed in said second side of said body, such that light arriving at any of said at least one output holographic optical elements exits said body in a direction substantially similar to said given direction of said incident light and reaches one of the eyes of the viewer;
   wherein, said holographic plate is positioned with respect to said eye of the viewer, and said at least one input and output holographic optical elements are positioned with respect to said body, such that passive light radiation originating from both the first and second scenes is simultaneously directed into said eye of the viewer.

2. An optical system as in claim 1, further comprising:
   (d) a corrective optical lens for correcting a vision defect of the viewer, said corrective optical lens being positioned between said holographic plate and said eye of the viewer.

3. A headset for enabling a viewer to simultaneously view a first scene and a second scene comprising two optical systems as in claim 1, each of said two systems being positioned in front of one of the eyes of the viewer.

4. A method for enabling a viewer to simultaneously view a first scene and a second scene, both the first and second scenes are perceived by the viewer through passive radiation, the method comprising the steps of:
   (a) providing the viewer with a holographic plate through which the viewer sees the scenes, said holographic plate including:
      (i) a body made of a light transmitting material, said body having a first side and a second side;
      (ii) at least one input holographic optical element formed in said first side of said body, said material and each of said at least one input holographic optical elements are selected such that incident light entering said body via at least one input holographic optical element and having a given direction undergoes a substantially total internal reflection; and
      (iii) at least one output holographic optical element formed in said second side of said body, such that light arriving at any of said at least one output holographic optical elements exits said body in a direction substantially similar to said given direction of said incident light and reaches one of the eyes of the viewer; and
   (b) positioning said holographic plate with respect to said eye of the viewer, and said at least one input and output holographic optical elements with respect to said body, such that passive light radiation originating from both the first and second scenes is simultaneously directed into said eye of the viewer.

5. The method of claim 4, wherein said holographic plate further includes:
   (iv) a corrective optical lens for correcting a vision defect of the viewer, said corrective optical lens being positioned between said holographic plate and said eye of the viewer.

6. The method of claim 5, wherein said holographic plate is two holographic plates, each of said plates being positioned in front of a different eye of the viewer.

7. The method of claim 6, wherein the viewer is further provided with a headset for housing said holographic plates.

8. The method of claim 4, wherein said holographic plate is two holographic plates, each of said plates being positioned in front of a different eye of the viewer.

9. The method of claim 8, wherein the viewer is further provided with a headset for housing said holographic plates.

10. A bifocal optical arrangement for using as bifocal eyeglasses by a viewer, in order to view a close scene and a distant scene, the bifocal optical arrangement comprising:
    (a) a magnifying-collimating eyepiece lens having a short focal length, for magnifying the close scene and for collimating light passing through said magnifying-collimating lens;
    (b) an optical arrangement for directing incident light originating from the close scene and passing through said magnifying-collimating lens into an eye of the viewer, and at the same time, for directing incident light originating from the distant scene into said same eye of the viewer, and
    (c) a corrective eyepiece lens for compensating for a long distance visual defect, said corrective lens being positioned between said optical arrangement and said same eye of the viewer,
    wherein said optical arrangement includes a holographic plate, said holographic plate including a first input holographic optical element for passing incident light passing through said magnifying-collimating lens into said holographic plate.

11. The bifocal optical arrangement of claim 10, wherein said holographic plate further includes an output holographic optical element for passing light entering said holographic plate out of said holographic plate to reach said eye of the viewer.

12. A method for a viewer to view a close scene and a distant scene, using a bifocal eyeglass, the method comprising the steps of:
    (a) providing the viewer with the bifocal eyeglass including:
       (i) a magnifying-collimating eyepiece lens having a short focal length, for magnifying the close scene and for collimating light passing through said magnifying-collimating lens;
       (ii) an optical arrangement for directing incident light originating from the close scene and passing through said magnifying-collimating lens into an eye of the viewer, and at the same time, for directing incident light originating from the distant scene into said same eye of the viewer, and
       (iii) a corrective eyepiece lens for compensating for a long distance visual defect, said corrective lens being positioned between said optical arrangement and said same eye of the viewer, and (b) viewing, simultaneously, the close scene and the distant scene, by the viewer, wherein the bifocal eyeglass is a pair of eyeglasses.

13. The method of claim 12, further comprising the step of:

(c) selecting the close scene, by the viewer, from a plurality of close scenes.

14. The method of claim 13, wherein said selecting of said close scene is performed by a head movement of the viewer.

15. A method to be used by a viewer to view a close scene from a plurality of close scenes, and a distant scene, the method comprising the steps of:

(a) providing the viewer with a magnifying-collimating eyepiece lens having a short focal length, for magnifying the close scene and for collimating light passing through said magnifying-collimating lens;

(b) providing the viewer with an optical arrangement for directing incident light originating from the close scene and passing through said magnifying-collimating lens into an eye of the viewer, and at the same time, for directing incident light originating from the distant scene into said same eye of the viewer, said optical arrangement including a holographic plate;

(c) providing the viewer with a corrective eyepiece lens for compensating for a long distance visual defect, said corrective lens being positioned between said optical arrangement and said same eye of the viewer;

(d) selecting a close scene from the plurality of close scenes, and (e) passing incident light passing through said magnifying-collimating lens into said holographic plate via an input holographic optical element.

16. An optical system to be used by a viewer to view a close scene of a plurality of close scenes, and a distant scene, the system comprising:

(a) a magnifying-collimating eyepiece lens having a short focal length, for magnifying the close scene and for collimating light passing through said magnifying-collimating lens;

(b) an optical arrangement for directing incident light originating from the close scene and passing through said magnifying-collimating lens into an eye of the viewer, and at the same time, for directing incident light originating from the distant scene into said same eye of the viewer; and (c) a corrective eyepiece lens for compensating for a long distance visual defect, said corrective lens being positioned between said optical arrangement and said same eye of the viewer, wherein said optical arrangement is designed and configured such that the viewer selects the close scene from the plurality of close scenes, and wherein said optical arrangement includes a holographic plate, said holographic plate including:

(i) a first input holographic optical element for passing incident light passing through said magnifying-collimating lens into said holographic plate.

17. The optical system of claim 16, wherein said holographic plate further includes:

(i) an output holographic optical element for passing light entering said holographic plate out of said holographic plate and reach said eye of the viewer.

18. Eyeglasses to be used by a viewer to view a close scene of a plurality of close scenes, and a distant scene, the eyeglasses comprising:

two optical systems, each of said optical systems including:

(a) a magnifying-collimating eyepiece lens having a short focal length, for magnifying the close scene and for collimating light passing through said magnifying-collimating lens;

(b) an optical arrangement for directing incident light originating from the close scene and passing through said magnifying-collimating lens into an eye of the viewer, and at the same time, for directing incident light originating from the distant scene into said same eye of the viewer; and (c) a corrective eyepiece lens for compensating for a long distance visual defect, said corrective lens being positioned between said optical arrangement and said same eye of the viewer, wherein said optical arrangement is designed and configured such that the viewer selects the close scene from the plurality of close scenes.

* * * * *